(12) United States Patent
Cooper et al.

(10) Patent No.: US 8,181,262 B2
(45) Date of Patent: May 15, 2012

(54) NETWORK USER AUTHENTICATION SYSTEM AND METHOD

(75) Inventors: Robin Ross Cooper, La Mesa, CA (US); Robert T. Kulakowski, Rancho Santa Fe, CA (US)

(73) Assignee: Verimatrix, Inc., San Diego, CA (US)

( * ) Notice: Subject to any disclaimer, the term of this patent is extended or adjusted under 35 U.S.C. 154(b) by 1195 days.

(21) Appl. No.: 11/489,779

(22) Filed: Jul. 20, 2006

(65) Prior Publication Data

US 2007/0022469 A1    Jan. 25, 2007

Related U.S. Application Data

(60) Provisional application No. 60/701,239, filed on Jul. 20, 2005, provisional application No. 60/803,679, filed on Jun. 1, 2006.

(51) Int. Cl.
    H04L 29/06    (2006.01)
(52) U.S. Cl. ............ 726/28; 713/156; 725/25; 709/223; 709/225
(58) Field of Classification Search ............ 726/12, 726/28; 725/25, 30–31; 709/225
See application file for complete search history.

(56) References Cited

U.S. PATENT DOCUMENTS

| | | | |
|---|---|---|---|
| 5,550,529 A * | 8/1996 | Burge | 340/5.6 |
| 7,587,067 B1 * | 9/2009 | Schiller | 382/116 |
| 2003/0165241 A1 * | 9/2003 | Fransdonk | 380/258 |
| 2003/0167392 A1 | 9/2003 | Fransdonk | |
| 2003/0217137 A1 * | 11/2003 | Roese et al. | 709/223 |
| 2004/0071164 A1 | 4/2004 | Baum | |
| 2004/0111640 A1 * | 6/2004 | Baum | 713/201 |
| 2004/0203846 A1 | 10/2004 | Caronni et al. | |
| 2004/0205335 A1 | 10/2004 | Park | |
| 2005/0041675 A1 * | 2/2005 | Trostle et al. | 370/401 |

FOREIGN PATENT DOCUMENTS

| | | |
|---|---|---|
| EP | 1215907 | 6/2002 |
| WO | 2005032093 | 4/2005 |

OTHER PUBLICATIONS

Shaw, "Using Internet Technologies for Secure Substation Access and Control", Jul. 2000, pp. 363-368.*
Hooks et al., "Onion Routing and Online Anonymity", Apr. 2006, pp. 1-24.*
International Search Report and Written Opinion from PCT/US06/28505 dated Dec. 5, 2008.
Extended European Search Report dated Feb. 17, 2011 for European Patent Application No. 06788201.

* cited by examiner

*Primary Examiner* — Taghi Arani
*Assistant Examiner* — Thaddeus Plecha
(74) *Attorney, Agent, or Firm* — Procopio, Cory, Hargreaves & Savitch LLP

(57) ABSTRACT

In a network user authentication system, a network user is identified for authentication purposes using the unique identifier for a dedicated physical communication line associated with the building in which the network user is located or a digital certificate which is associated with a secure component or communication line physically attached to a building. An authentication server initially verifies the identification of the dedicated communication line to be associated with a network service subscriber or issues a unique digital certificate to be associated with the dedicated communication line for authentication purposes. The digital certificate may be stored in a building gateway or in an edge site module which is connected to the secure components of a plurality of buildings and stores unique digital certificates for each building.

38 Claims, 14 Drawing Sheets

Encrypted Message for
Host Data Center 10

550

Encrypted Message for Host
Edge Site 30 containing
message for PC

552

Encrypted Message for PC
554

Fig 14

NETWORK USER AUTHENTICATION SYSTEM AND METHOD

RELATED APPLICATION

The present application claims the benefit of co-pending U.S. provisional patent application No. 60/701,239 filed Jul. 20, 2005 and U.S. provisional patent application No. 60/803,679 filed Jun. 1, 2006, both of which are incorporated herein by reference in their entirety.

BACKGROUND

1. Field of the Invention

The present invention relates to a system and method for authenticating network users or establishing trusted communication paths between network devices.

2. Related Art

As Internet traffic grows, demand for better means to authenticate network users increases dramatically. The web has proven itself to be an extremely valuable and necessary tool. However, the potential for fraud and misuse increases daily.

In years past, security companies such as Verisign, Thawt, and others have built attractive business models by providing means to authenticate network users. By issuing and revoking Digital Certificates using the Public Key Infrastructure (PKI), network users can be confident that certain transactions are handled securely. The problem with the "Verisign" model has been the server-side typically takes the necessary steps to authenticate itself, however, consumers and other network clients have shown little interest in obtaining solutions that can help them to likewise become authenticated. For the most part, network clients are unwilling to pay for their own authentication means as it is not clear what advantages they can gain. In addition, it is unclear how authentication mechanisms can work across multiple platforms (PCs, laptops, mobile devices, etc.)

Since virtually all clients on public networks are not authenticated in any way, the potential for fraud and damage is significant and getting worse.

Over the last few years, a number of initiatives have been introduced to help identify network clients. Some of these initiatives include:

Secure dongles

Smart card technologies

Secure, uniquely identifiable elements within chips.

These initiatives have all been flawed from the beginning as these (and other) hardware components can be easily lost, stolen, or exchanged. Although these solutions offer a minimum level of authentication, their effectiveness is limited due to the consumer's inability to keep them secured.

Therefore, in today's networked world, there is adequate authentication of the host (server side) systems, but there is little or no authentication on the client-side. If there can be a viable way to authenticate each client reliably, new and potentially lucrative business opportunities would begin to emerge and a network of end-to-end "trust" could become a reality.

Therefore, what is needed is a system and method that overcomes these significant problems found in the conventional systems as described above.

SUMMARY

Embodiments described herein provide an authentication system and method which can authenticate network client users and establish trusted communication paths between two or more parties.

According to one aspect of the present invention, a network user authentication system is provided in which a secure component or a physical network connection associated with a building is used to authenticate one or more network devices in the building, so that secure network communications are directly associated with a building owner or occupant. At least one user device in the building is linked to the secure component, and a security server is linked to the secure component or connection. The security server is configured to determine a physical connection identification (ID) for the secure component and to associate the physical connection ID with a client ID for tracking a specific client or user device in the building which is requesting service over a public network.

The security server may be part of a merchant website or network, or a service provider site such as a telephone service provider or telephone company (Telco) which provides service to multiple homes and businesses, or part of a network edge site, such as a telephone company edge site, cable television edge site, or power company edge site linked to buildings in a neighborhood, or a wireless network base station linked to buildings in a neighborhood, or may be a separate security server connected to the secure component over a network. The security server, whether stand-alone or incorporated in a remote website or a local edge site, may be used by different merchants and network users in order to authenticate other network users who wish to do business with the merchants or network users. This system associates a user device with a fixed building, or a physical connection ID permanently associated with the building, verifying that a communication path between two parties can be trusted, i.e., establishing a trusted communication path. The two parties could be a network merchant or service provider and a network user, or two network users, for example.

The secure component may be any established communication line with a building, including physical connections based on cable modems, digital subscriber line (DSL) or DSL derivatives, wireless input ports, optical inputs or lines, and the like, or may be a meter box or the like as used by a utility company to track building utility usage for billing purposes, with a built in communication device for communicating with a utility company server over a network. In one embodiment, the secure component may be the last mile connection from a network access point or edge site to a subscriber's physical network access device, such as a data modem, cable modem, asynchronous transfer mode (ATM) modem, fiber optic modem, DSL modem, or other in-home modem device. The key for authentication is to establish the last mile connection that provides service to a home or other physical location, and to associate that connection with a user in the home or physical location for security purposes. The connection may be anything from a physical copper wire pair connection to a home, or a Data Over Cable Service Interface Specification (DOCSIS) address on a Cable Modem Termination System (CMTS), or the media access control (MAC) or logical link control (LLC) or radio link address on a wireless last mile connection between a home and a network, a digital subscriber line access multiplexer (DSLAM) circuit ID or connection port as reported by a dynamic host configuration protocol (DHCP) service and relay agent, or a base station connecting a wireless customer to a wireless network. The client ID may be an arbitrary value that has a permanent fixed value for a subscriber or may be a temporary value for only a single connection. The client ID may be based on an IP address, IP address and port number, subscriber ID, random number derived from the subscriber ID, an identifier provided by a network edge site such as a network address translation (NAT) address, any other data value that may be used to associate a client device with a communication line ID.

The security server may use network equipment to establish the connection or communication line ID. In one example, a trace route mapping can be followed to determine the network topology so that a service edge site, such as a Telco edge site, can be identified. Once the edge site is identified, the security server sends an inquiry to the edge site with the Internet protocol (IP) address of the requesting user or client, asking for identification of the communication line connecting the Telco edge site to the building in which the user device is located.

One example of a situation where one network element could be identified using the authentication system is when a set top box (STB) is authenticated by its physical connection to a Telco over a copper wire pair (as used for DSL and dial-up). If the STB is involved in an e-commerce transaction, such as requesting purchase of a movie, the movie service provider or Telco can use this authentication system to verify that the requesting STB is from the correct physical copper wire pair which is connected to the building, by comparing the physical connection ID with the user or client ID.

In another embodiment, an additional layer of security may be provided by adding a signature or security code to the system. In one embodiment, a secure control unit is associated with the secure component and has a data storage module in which a unique digital certificate is stored, and a processor is configured for communication with the security server over a private network. The security server initially verifies the building location and issues the unique digital certificate associated with the building location to the secure control unit. The secure control unit may be mounted inside or otherwise connected to the secure component at the building location or may be in an edge site module which is connected to the secure components of a plurality of buildings. The edge site module in this case stores unique digital certificates for each building.

The secure component may be a user network gateway or connection port such as an existing broadband telecommunication line which is permanently connected between the building and a telecommunication company edge site, or a wireless network gateway associated with a dedicated wireless link to the building. The unique digital certificate is then associated only with that line to that particular building. Since the digital certificate is directly associated with a physical building (or to a gateway physically secured or integrated with the building), it can be used to reliably authenticate the people who live, own, or work in the building. The digital certificate may be attached to a dedicated broadband access line to a building, either in a secure control unit at the building end of the line or at a provider edge site. In one embodiment, each provider edge site contains a control unit having a data storage module holding digital certificates for all of the buildings to which it provides connections and which subscribe to the authentication service. Each digital certificate is then associated only with a communication path to the particular building with which that certificate is associated. Since buildings typically cannot move, and the secure component is attached to the building in such a manner that it is difficult or impossible to remove without disrupting the connection to the building, the digital certificate can provide a reliable indication of the identity of a client communicating over the network via that digital certificate.

In another embodiment, the secure component comprises a secure box or housing which is physically attached in some way either inside or outside a building, and contains the secure control unit holding the digital certificate specific to that building. In one example, the secure control unit may include a metering device for a particular utility, and can communicate with a utility server for both meter reading and authentication purposes. The private network or virtual private network (VPN) in this case is the utility company network, and authentication services may be carried out either by the utility server or by a separate authentication server linked to the utility server.

A secure gateway module may be provided at the building for connection to a plurality of user devices in the building. In one embodiment, the secure control unit comprises the gateway module. In another embodiment, the secure control unit is connected to the gateway module. The gateway module may be a router or enhanced router module.

The system may also include at least one hardware security device associated with the gateway module and hardware security devices associated with each user device in the building. The security devices may be universal serial bus (USB) dongles, smart cards, trusted platform modules (TSM), subscriber information module (SIM) chips for wireless devices, and the like. In an exemplary embodiment of the invention, the digital certificate that is dedicated to a specific building can be matched with corresponding keys stored in the hardware security device of the gateway module connected to the building for the network to operate successfully. The hardware security device in the gateway module in turn is cryptographically synchronized with the security devices in each user device for authentication to be successful and network communications to proceed. This provides a two level authentication, specifically certificate authority or authentication server to building, and building to user devices in the building.

According to another aspect of the present invention, an authentication method is provided, which comprises registering a subscriber to a network service by associating a subscriber identification (ID) with the ID of a physical connection or secure component of the building in which the prospective subscriber is located, storing a record of the subscriber ID and physical connection ID, determining the physical connection ID of a connecting subscriber at each subsequent request for service received from the subscriber, comparing the physical connection ID with the previously established subscriber ID for verification purposes, and supplying the service only if verification is successful.

In one embodiment, the geographic location of the building at the authentication server is verified based on the location of the secure component or physical connection, a unique digital certificate is associated with the verified building location, and the unique digital certificate is sent to a secure control unit associated with the secure component or physical connection, and the unique digital certificate is stored in a data storage module of the secure control unit. In another embodiment, a previously created connection ID for a physical connection to a building used by the user to communicate with a network is determined by a security server and the physical connection ID is associated with a subscriber ID for the user.

In general, in modem cryptography, there are three levels of authentication that are desired before an entity can be considered completely safe and reliable for secure communication purposes. These levels are:

1. What you have
2. What you know
3. Who you are

Item 1 can be achieved by supplying some type of secure hardware device having a secure embedded key to a client device, such as a smart card, a USB dongle, a secure chip or a secure element within a chip, and other hardware-based cryptographic solutions. Item 2 can be achieved by having a user specific user name and password. Item 3 is more difficult to achieve. Biometric identification devices include retinal scanners and fingerprint analyzers, but such equipment is typically expensive to install and difficult to administer. Embodiments described herein provide the "who you are" identification by using a physical structure such as a building or home, or a secure component connected to the physical structure, as a biometric device. Virtually all physical structures, particularly those equipped with broadband access, have an owner and only a limited number of individuals who live or work in the structure. By identifying service subscribers based on a unique ID of a physical connection or network communication line into a building, a subscriber in this invention can be directly associated with only one physical structure which cannot move. The method and system can be used to provide an identification of the people who own, live in, or work in a physical structure.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 14 is a block diagram illustrating encryption layers in a message originating from a merchant network and addressed to a user device connected to an authenticated gateway or secure component attached to a building.

DETAILED DESCRIPTION

Certain embodiments as disclosed herein provide for authentication of users based on a fixed physical building address or location. For example, one method as disclosed herein allows for associating a unique digital certificate with a home or building unit or physical connection to a home or building.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

The following description uses the term Telco (Telephone Company) as a generic term for any service provider, and is used to identify any type of communications or network service provider such as a telephone company, cable television service provider, cable television (tv) operator, Internet service provider, satellite television provider, fiber network connection companies, wireless service providers, cellular phone service providers, and the like.

Figure 1:
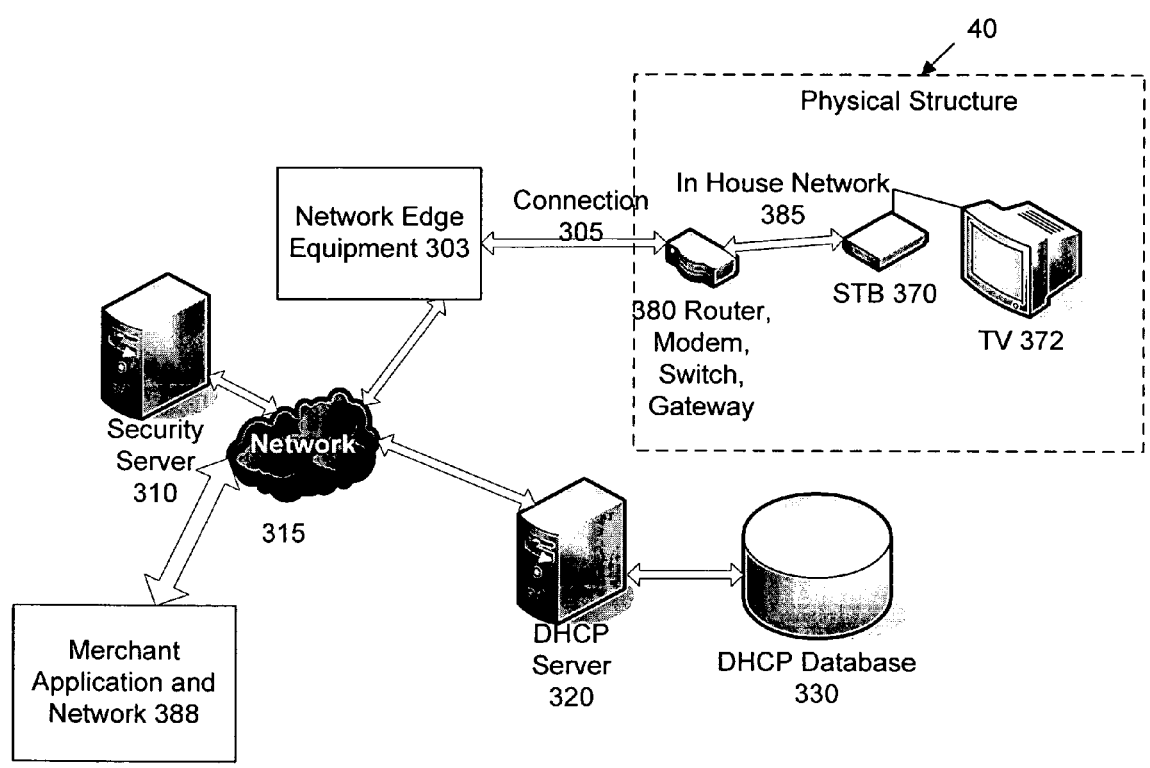
FIG. 1 is a block diagram illustrating a network using an authentication system and method according to an exemplary embodiment of the invention.

FIG. 1 is a block diagram of a communication network system with various network components. An authentication system according to an exemplary embodiment of the invention is incorporated in the network systems, as explained in more detail below, and can be used when a user device such as set top box (STB) 370 in a physical structure or building 40 connects to a merchant application/network 388. STB 370 is an electronic device that is connected to a communication channel, such as a phone, Internet Services Digital Network (ISDN) or cable television line, and produces output on a conventional television screen. Set-top boxes are commonly used to receive and decode digital television broadcasts and to interface with the Internet through the user's television instead of a PC. Set-top boxes fall into several categories, from the simplest that receive and unscramble incoming television signals to the more complex that can also function as multimedia desktop computers that can run a variety of advanced services such as videoconferencing, home networking, Internet Protocol (IP) telephony, video-on-demand (VoD) and high-speed Internet TV services. However, it should be understood that the in-home network in FIG. 1 may be connected to many other types of user electronic communication device and the term set top box (STB) as used in connection with FIG. 1 is intended as a generic term to cover any type of user electronic communication device including STBs, personal computers (PC), personal digital assistants (PDA), networked MP3/video player (where MP3 is an MPEG-1 Audio Layer-3 device, and MPEG stands for Moving Picture Experts Group), cellular phone, or the like.

STB 370 is shown connected to television 372 in the illustrated embodiment, and connects via in-home or building network 385 to consumer premises equipment 380. Consumer premises equipment (CPE) 380 represents any form of customer premise equipment such as a router, modem, switch, gateway, or any network processing equipment that can be used to interface in home network equipment to a connection or communication line 305 to the outside world through which data can be received and transmitted. Connection 305 can be any form of wired, wireless, cabled, or optical interconnection to outside network edge equipment, edge site, or access point 303, and can be based on a point-to-point, star, ring, or other network topology. In this embodiment, the authentication system uses an identifier of the physical connection 305 in order to authenticate a user of a device in house or house network 385, as described in detail below in connection with FIGS. 1 to 4.

The client device such as STB 370 may be directly connected to the CPE modem 380, or alternatively served off a local access point router subnet employing a Network Address Translation (NAT)/Firewall. NAT is an Internet standard that enables a Local Area Network (LAN) to use one set of IP addresses for internal traffic and a second set of addresses for external traffic.

The network edge equipment or site 303 is connected via network 315 to a merchant application and network 388. The merchant application and network 388 can be a stand alone e-commerce or network based company service, or may be a utility service offered by a telephone company (TelCo) or other third party. Network 315 may be a private or company network, or a public network such as the Internet and communication between the edge site 303 and merchant application on network 388 may be via one or more networks 315. The network edge equipment 303 is appropriate for the type of physical networking layer used to provide service to the subscriber, and includes but is not limited to physical connection based on cable modems, digital subscriber line (DSL) and DSL derivatives, wireless, and optical technologies. DSL technologies use sophisticated modulation schemes to pack data onto copper wires. They are sometimes referred to as last-mile technologies because they are used only for connections from a telephone switching station to a home or office, not between switching stations. In FIG. 1, the Network Edge Equipment is illustrative of the edge location where a communication line 305 connects to CPE equipment 380. The network system can also include a Network Operating Center (not illustrated between network edge equipment 303 and network 315). Network Data Center processing functions can be distributed at other locations or using other servers.

A security server 310 is connected to the network edge equipment via the network 315. Although the security server 310 in FIG. 1 is a separate site, it may be part of the network edge equipment or edge site 303, part of a network operating center, or part of the merchant application site 388. FIG. 1 also illustrates a Dynamic Host Configuration Protocol (DHCP) server 320 connected to DHCP database 330, for communication with client CPE equipment 380 via network 315. DHCP server 320 can be a standard Internet Protocol based server that is used to provide Internet Protocol (IP) addresses to CPE equipment or other computer equipment where an IP address is assigned for access to the network. DHCP is a known protocol for assigning dynamic IP addresses to devices on a network. Alternatively, DHCP server 320 may comprise other equipment that can be used to assign address information or access information to computers or other client devices (STBs, PDAs, PCs, cellular phones and the like) for connection to a network. DHCP server 320 may also be implemented as a database with address information for computers or other client devices connecting to a network 315 via a host network edge equipment 303, such as a Telco edge site.

Figure 2:
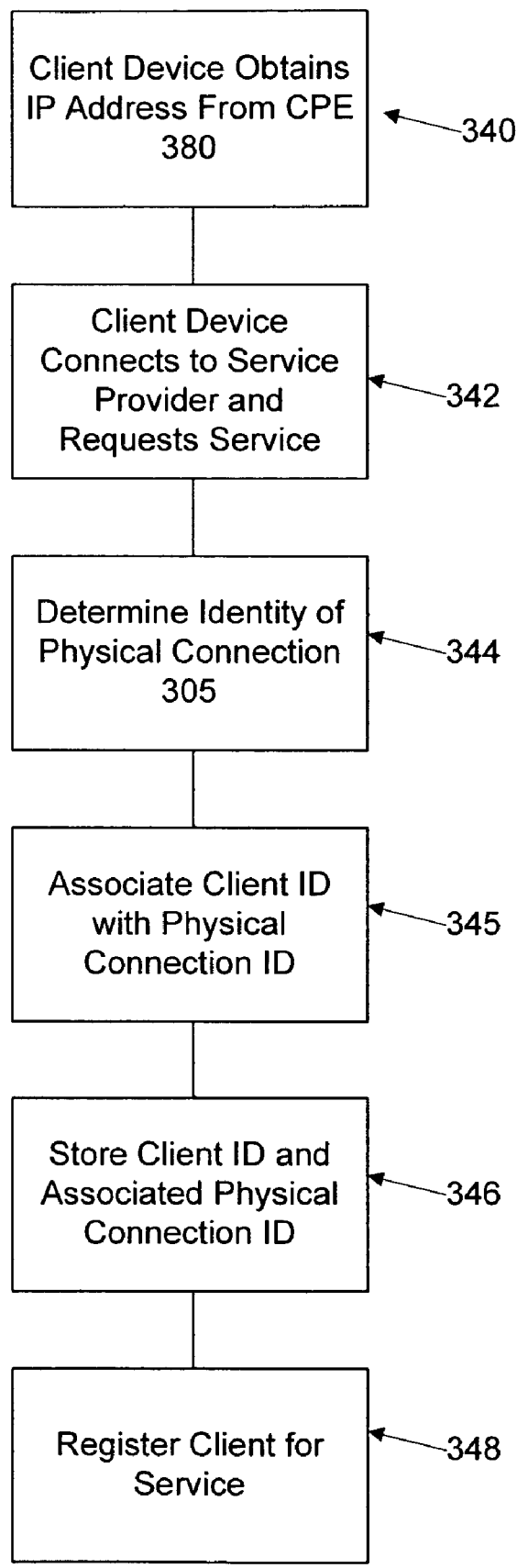
FIG. 2 is a flow diagram illustrating a method of initially registering a client for authenticated service with a service provider according to an exemplary embodiment of the invention.

The process for authentication (i.e., for initiation of a trusted communication path) according to one embodiment is described below. The process begins when the client device represented by STB 370 powers on and attempts to connect to the Telco service or merchant application 388. STB 370 can typically request an IP address from router, switch or gateway equipment shown as part of CPE 380 equipment. The STB 370 IP address is a local Internet protocol (IP) address that may not be known by Network Edge Equipment 303 or DHCP Server 320. FIG. 2 illustrates a method according to an embodiment of the invention for initially registering a client for authenticated or trusted service with a service provider, such as the merchant application 388. This method may be used when any client device in a building contacts a service provider to obtain any type of service over a network. One example of such a service is when a user device such as a set top box contacts a secure movie or video delivery service to obtain an application key for video decryption.

The client device, such as an STB 370, first powers on and obtains an IP address from the CPE 380 (step 340). The client device then connects to the service provider (step 342) and requests service. The STB connects to the network edge equipment 303 using the IP Address of CPE 380 equipment, not the IP address of STB. The IP address of the STB is local to In Home or In House Network 385 and the client (STBs) IP address presented to the Merchant or service provider can be different from the IP address assigned to the STB by the in home network router, switch, or gateway of CPE 380. The IP address presented for the STB is the IP address provided by the Network Edge Equipment 303 for the CPE 380 equipment.

When STB contacts Merchant Application and Network 388 in order to register for service from the Merchant, the registration process can use the IP address for the client or CPE 380 and can determine from appropriate network equipment the identity of the physical connection 305 between the Network Edge Equipment 303 and STB 370 which is connected to the network edge equipment via the CPE 380 (step 344). Techniques for determining the identity of physical connection 305 are described in more detail below. The registration process may use a stand-alone security server 310 as indicated in FIG. 1, or may be part of the merchant application or site 388. The client registration information includes an identifier referred to as the Physical Connection ID for the connection 305 between Network Edge Equipment 303 and CPE 380.

The Physical Connection ID is an identifier that uniquely identifies the physical connection 305 between the network edge equipment 303 and the CPE 380. There are various techniques which may be used in order to obtain the identity of a physical connection 305. A DSL example of a Physical Connection ID is the physical port ID for the DSL digital subscriber line access multiplier (DSLAM) equipment used to connect DSL service to the copper wire pair telephone line connecting a Telco Central or Local Office to a subscriber. DSLAM links the DSL connections of many customers to a single high speed asynchronous transfer mode (ATM) line. Physical Connection IDs can be obtained for fiber optic connections, cable modem systems for Cable TV based Internet service and a virtual Connection ID can be obtained for wireless equipment. For example, in Fiber To The Home (FTTH) networks, the connection ID can be an identifier for the Optical Network Unit (ONU) used to interface a subscriber to the optical network. The ONU identifier can be used to associate a video (or other) service subscriber with the physical fiber connection or ONU connection to the subscriber. It is also envisioned that the identifier for the physical connection 305 can be obtained using traceroute or other network mapping utilities to determine the physical connection 305. While the standard traceroute utility does not identify the physical connection 305, it is envisioned that a utility like traceroute can be created that can provide the physical connection 305 along with the signal route to a computer node.

In many network systems, the Network Edge Equipment 303 can forward on a DHCP request to a DHCP server when a client device (STB, PC, PDA, etc.) requests a network IP address using the DHCP protocol. In addition to acting as a DHCP relay agent, the network edge equipment 303 also adds a physical connection identifier (DHCP Option 82, for example) when forwarding DHCP requests through the network edge equipment 303. When network edge equipment 303 adds a physical connection identifier, the DHCP server can store the physical line identifier in the DHCP server leases file, a file that contains information about the DHCP processing and typically includes information about the IP address, CPE media access control (MAC) address, lease status, lease duration and other information. Current day DHCP processing for DSL based networks includes the DSL DSLAM adding a port identifier indicating the physical wires connected to the home via the DSLAM port number. The DSLAM port number is unique, and when a copper wire connects to the DSLAM port, the physical copper wiring between the home and the Telco network can be uniquely identified. In many systems, DHCP lease file information also includes any physical connection identifier added to the DHCP request (DHCP Option 82 for example) by the network edge equipment 303.

In situations where a physical connection identifier for the physical connection 305 between the network edge equipment 303 and the CPE 380 equipment is not available, software can be written to access this information by probing the network edge equipment 303 to obtain data that can be used to associate an identifier with the physical connection 305. An example of this probing is to read the circuit ID from a DSL DSLAM device using any method provided by the DSLAM device. Probing network edge equipment 303 is applicable for any network type (wireless, cable, fiber, DSL, Ethernet, etc.) and probing can be based on a method or methods of obtaining Physical Connection 305 from equipment. Typical methods of obtaining the physical connection 305 identifier include reading a database file, performing a Telnet session, accessing exposed interfaces on the network or network edge equipment 380, access a web service to obtain information, accessing information via a file transfer protocol (FTP) or hyper text transfer protocol (HTTP) interface, or other methods.

After the physical connection ID has been determined, the authentication process in this embodiment associates the Physical Connection 305 to a service subscriber (step 345) and stores the information on the subscriber and associated physical connection identification (step 346). This allows the service provider to authenticate a user using information that includes the physical connection 305, thus linking the user to a physical structure or building to which the identified physical connection is linked. Once the information is stored, the client is registered for service and can then receive services from merchant 388. After registration, the physical connection 305 is used to authenticate the user at each subsequent request for service, as illustrated in FIG. 3.

It is also envisioned by this application that a web service can be provided that allows a service provider to obtain Physical Connection 305 identifier from Telco or service provider using an exposed interface provided by Network Edge Equipment 303 or Telco Network equipment or DHCP Server 320 or Security Server 310, or other network location.

Although physical connection 305 information is sometimes used in current day systems when authenticating a client, this use is limited to when the network service provider authenticates a subscriber's CPE 380 device, and this information is not used in the authentication of subscribers beyond the physical connection layer, such as at the application layer for a service or at the e-commerce layer to authenticate a user of an e-commerce system, internet system, web service, email system, etc.

Figure 3:
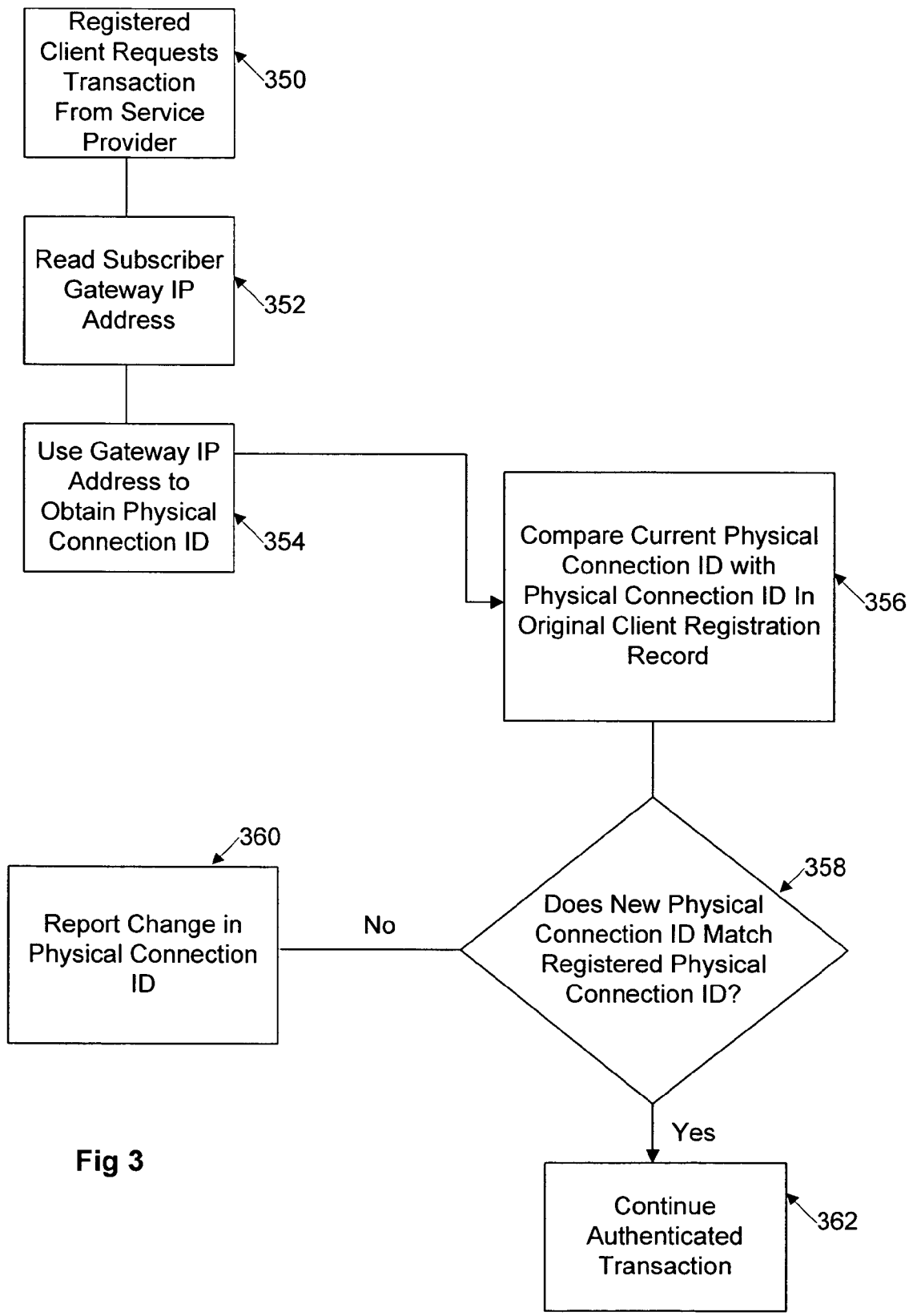
FIG. 3 is a flow diagram illustrating a method to identify subscribers or clients after initial registration as in FIG. 2.

FIG. 3 illustrates the authentication process for use in identifying subscribers or clients after registration, in order to detect attempted fraudulent attempts to access services. There are many ways a rogue individual referred to as a hacker can attempt to pirate or steal services. For example, the hacker may use cloned client devices such as STBs or PCs with duplicate subscriber information and attempt to impersonate an authorized subscriber. The authentication process illustrated in FIG. 3 can verify that a client is accessing the service from the same physical connection 305 that they used to register for the service and that there are not multiple clients with the same credentials active at the same time on the service.

As illustrated in FIG. 3, a transaction request from a registered client (or an unauthorized user attempting to impersonate a registered client using a clone device or the like) is received at step 350. The home gateway IP address (the IP address of the home gateway or CPE 380, not the IP address of the STB 370) of the connecting subscriber is then read (step 352). The gateway IP address of a subscriber is used to obtain the physical communication line or physical connection ID for the subscriber (step 354). This may be obtained from a network data entry that contains the physical communication line identifier for the gateway IP address. This can be obtained in many different ways, for example the DHCP Leases file can be read to obtain this mapping. Network equipment can also be queried for this information by reading a DSL DSLAM port ID from the DSLAM. Other methods can be used depending on the network. The subscribers gateway IP address is a temporary association because of the way most systems apply DHCP IP address management with temporary leases. As such, the subscriber is identified as being connected to a physical communication line and not an IP address. The Physical communication line identifier is unique for each subscriber and an example is DSLAM_IP_ADDRESS.PortNumber where the DSLAM_IP_ADDRESS is the IP address of one of many DSLAMs in the network and the .PortNumber field is a physical port on the DSLAM that connects the copper wiring to a subscriber's location.

The connecting client is then authenticated by comparing the current DSLAM_IP_ADDRESS.PortNumber or physical connection ID for the subscriber with the physical connection ID obtained when the user first registered for the service (step 356). Software can monitor the subscribers physical connection and check for multiple subscribers being active at the same time on different physical connections between the network and the subscriber. The subscriber's customer premise equipment maybe behind a home gateway or firewall and the subscriber's client IP address is an IP address that is local to the home or premise but is not be seen by the authentication system. This method associates the subscriber to a physical connection 305 to a building, rather than a client IP address, providing a better basis for authentication. The software determines whether there is a match between the new or current physical connection ID for the subscriber with the registered physical connection ID (step 358). If there is a match, the connection can be trusted and the transaction can continue (step 362). If the physical connection ID does not match the registration information, the change is reported (step 360), and the transaction may or may not proceed, depending on whether the change is for a valid reason or whether it is suspected to be a clone on the network.

In step 360, processing software can report that the equipment used by a subscriber is now on a different DSLAM port than when they registered for the service. The subscriber devices physical connection may have changed for a number of different valid reasons, including a technician moving the subscriber to a different port on the DSLAM, or a technician moving a STB in the field and not updating the subscriber's information, or even when the subscriber moves the STB. While these conditions do not constitute a clone being on the network, the process can report these types of events.

Figure 4:
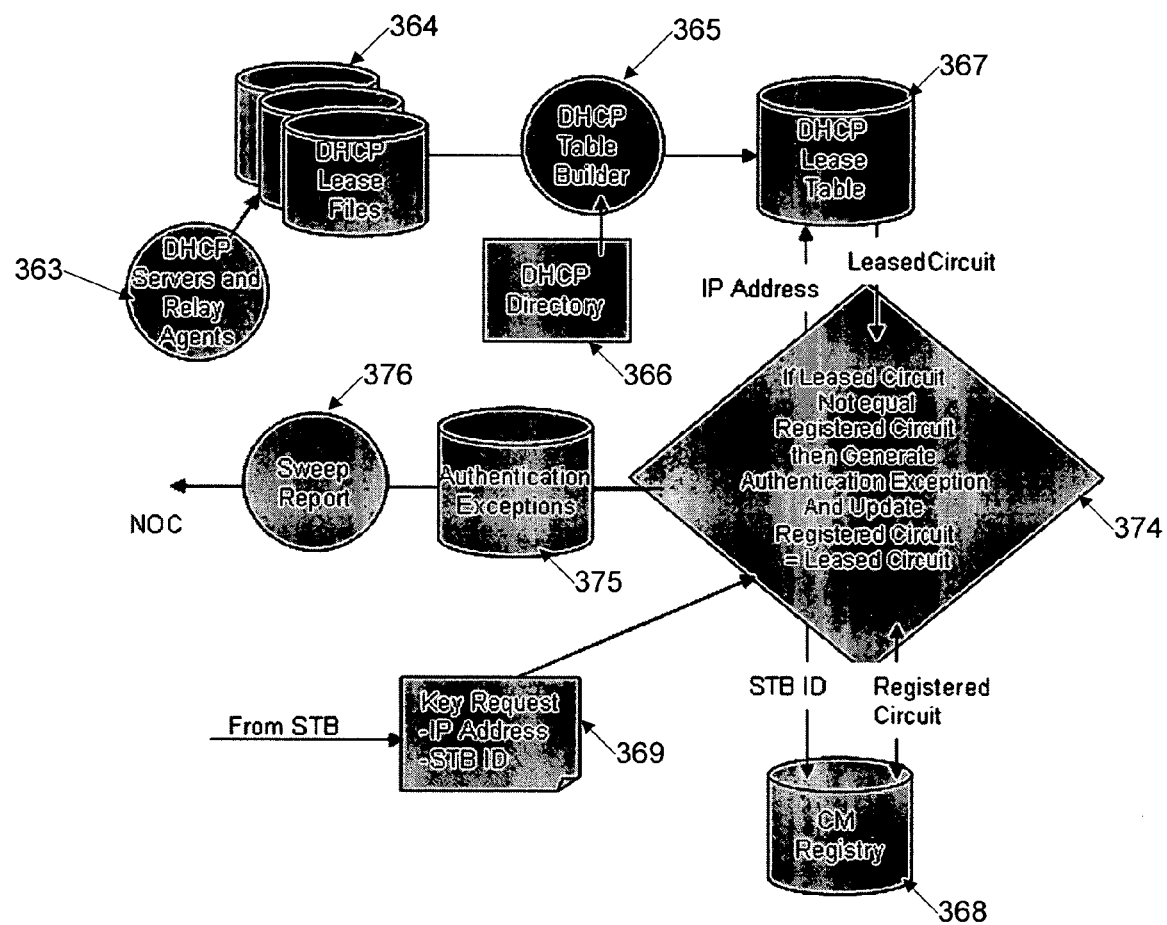
FIG. 4 is a logical diagram illustrating the logical process steps and data storage modules used for real-time authentication of a user in an embodiment of the invention.

A legitimate STB uniquely identified by a MAC address can only be present on a single DSLAM physical port address at any given point in time. In one embodiment, the authentication system and method detects a cloned STB by searching DHCP lease records for an STB connected to more than one physical line, using DHCP service configured with relay-agent-information extension options, as described in more detail below with reference to FIGS. 1 to 4. FIG. 4 illustrates the logical processes and data stores used in the system of FIG. 1 for real time registration authentication as illustrated in FIGS. 2 and 3 and for sweep reporting of the presence of potential clones. The authentication server for carrying out the authentication process may reside on a separate security or authentication server 310 or may be provided at a network operating center connected to network edge site 303, or the merchant application site 388 in other embodiments.

As illustrated in FIG. 4, DHCP servers and relay agents 363 are connected to DHCP lease files storage module 364. A DHCP table builder 365 is connected to DHCP lease files storage module 364 and to a DHCP directory 366. Tables created by the table builder 365 are stored in DHCP lease table module 367. All STB associated data along with specific circuit information is stored in circuit management (CM) registry 368, i.e., the customer registration information and associated physical connection IDs. When a key request or service request is received from an STB (369), the system determines whether the leased circuit from which the request originated corresponds to the registered circuit (374), by comparing information stored in the DHCP lease table with information stored in the circuit management (CM) registry 368. If the circuits do not match, an authentication exception is generated and stored in an authentication exception module 375 for later processing in a sweep report (376). When a match is not found at step 374, the STB can be denied service or silently noted for later investigation. If there is a valid reason for the change in circuit identification, the CM registry may be updated to indicate that the registered circuit for this particular client corresponds to the leased circuit.

One example of an authentication system as illustrated in FIGS. 1 to 4 will now be described in more detail. In order to authenticate a user or client, the MAC address and DSL port number (opt. 82) can be obtained from the DHCP server or a relay server for any given IP address. In the embodiment illustrated in FIG. 4, DHCP status is accessed from DHCP.Leases file. In alternative embodiments, equivalent status information can be obtained using Total Manage (TM) Middlewave from Myvo/Siemens, which obtains entitlement and other information for client. Alternatively, DHCP status logs can be output to the authentication server, or DHCP request traffic from the authentication server can be sniffed.

DHCP activity is maintained in /etc/dchpd.leases or the DHCP lease files 365, which includes these optional fields harvested from the network edge DHCP relay-agents 363:

| Field Name | Field ID | Data type |
|---|---|---|
| relay-agent-info | 82 | blob (sequence of bytes) |
| relay-agent-circuit-id: Identifying port number for DSLAM | 82 (sub-option 1) | blob |
| relay-agent-remote-id: ID for CPE (STB, modem) | 82 (sub-option 2) | blob |

While remote IDs are assumed to be globally unique, circuit IDs are only unique for the DSLAM and can be qualified with a subnet address to insure uniqueness for the authentication server. Consider the degenerate case such that a STB is cloned but happens to occupy the same circuit on two different subnets. In order to detect this clone, both the subnet and circuit can be tested for uniqueness. The DHCP protocol relay-agent is referenced in the giaddr field which is the IP address of the relay agent. The circuit-ID option in the leases files is the concatenation of giaddr and circuit. The "giaddr" field is a gateway IP address, i.e., a term used to refer to the IP address for any relay agent between the DHCP server and the circuit (such as DSLAMs, gateways, etc.). The leases file may be maintained as a flat American Standard Code for Information Exchange (ASCII) text file, and may vary in content and layout. A leases file plug-in is used to abstract the native file access.

For large scale installations, it remains to be determined if all leases files have the identical format. In concept, a heterogeneous system could have different DHCP servers, lease file formats, and consequently different lease file plug-ins. The DHCP lease information from a current day DHCP server can look similar to the following example showing an issued IP lease and circuit option:

```
lease 172.22.22.254 {
    starts 1 2006/02/06 15:46:27;
    ends 1 2006/02/06 16:46:27;
    tstp 1 2006/02/06 16:46:27;
    binding state free;
    hardware ethernet 00:03:e6:00:3c:84;
    option agent.circuit-id "10.160.220.232:1-3-26-0-adsl-0-36";
}
```

In this example, the giaddr field is 10.160.220.232. For a direct connected STB, the DHCP leases file entry has the IP address and MAC of the STB. In the access point (AP) case, the DHCP leases file entry has the IP address and MAC of the AP and not of any of the STB(s). In this description, the term "access point" refers to a hardware device or computer software acting as a communication hub for users of a wired LAN. The circuit information however is common to all equipment in the CPE domain, both the AP and STB(s).

In order to facilitate the time-of-registration resolution of circuit-ID, a DHCP Leases Table 367 is created. The leases table imports all leases flat file information and keys on IP address to associate the address with the circuit ID for connection 305 associated with the IP lease. This provides an improved level of performance over flat file processing during registration. In one example, the table may include the following:

| Field Name | Description | Data type and Size | Unique |
|---|---|---|---|
| Lease IP | Leased IP Address | IPV4 text: 16 IPV6 text: 48 | Yes |
| DHCP lease expire | Lease expire | DHCP Timestamp | N/A |
| Leased Circuit | Circuit ID associated with this IP lease | Free format string N (34 characters in sample) | Yes |

A batch process is implemented to parse DHCP leases files 364 and import the data to the DHCP Leases table 367. The builder can be run as a background process. The leases table builder should yield to the higher priority system tasks including registration server. The table builder can use a DHCP directory to locate DHCP Leases files. The directory comprises a master list of all DHCP servers whose lease files are processed. The directory can be manually populated, managed by an operator UI, and ultimately be automatically generated by DHCP discovery.

The authentication system may register an STB directly or may register an access point (AP) of the STB. For a directly connected STB 370, the STB issues a Key Request with its IP address and MAC or STB ID in step 369. The registration or authentication server (either security server 310 or a server provided at the merchant application site) can associate the STB MAC to the circuit using the leases IP address at registration time.

For AP registration, when the STB registers, it issues a Key Request 369 containing its STB ID (MAC). The request IP is NAT translated by the access point or CPE 380 such that the Key Request contains STB MAC plus the access point IP address. The authentication or registration server associates the STB MAC to the circuit using the leases IP address at registration time.

For multiple STBs or user devices, the registration process is handled the same way, in this case using the unique MACs issued by the multiple STBs. In each case the registration server receives a Key Request with a unique MAC and access point or AP IP, which is used to retrieve the circuit ID.

The process is similar for both direct STB and AP registration, since the IP always resolves to the CPE circuit. Registration plays an important role in performing circuit-based authentication. Since the STB MAC may only be known at the time of the initial key request, it is the registration event that drives the authentication. Circuit based authentication can employ business logic to detect cloned STBs. Any such STB can be actively denied keys, or silently noted for later investigation.

Rejected or suspected results of circuit authentication are inserted in the Authentication Exceptions Table 375 for later processing in the sweep report 376. Unauthorized requests may be rejected and then logged in the exceptions table 375. Other types of exceptions can also be stored in this table. In one embodiment, the records stored in the authentication exceptions table 375 include the following:

| Field Name | Description | Data type and Size | Unique |
|---|---|---|---|
| STB MAC | MAC Address for STB | Dynamic range of MAC address 48 bit in dashed hex string | No |
| IP Address | IP address associated with the MAC | Used to assist the network operator to locate the MAC | No |

| Field Name | Description | Data type and Size | Unique |
|---|---|---|---|
| Exception Code | Exception Cause code - Circuit Authentication | IPV4 text: 16 IPV6 text: 48 ENUM | N/A |
| Time-of-Day | Current time of day at time exception was noted, used for sweep report filtering and for scheduled maintenance. | System Timestamp | N/A |
| DHCP lease expire | Lease expire at time of circuit authentication and exception noted | DHCP Timestamp | N/A |
| Registered Circuit Before | Circuit ID previously assigned to MAC in CM database | Free format string N (34 characters in sample) | N/A |
| Registered Circuit After | Circuit ID now assigned to MAC in CM database | Free format string N (34 characters in sample) | N/A |

Cloned STBs in the same CPE cannot be easily detected since they share the same circuit. A legitimate use case where the STB is power cycled or moved room to room could also lead to this condition. To extend this limitation, a multiple dwelling unit sharing a common AP could serve multiple STBs. As a countermeasure, a practical upper limit on the number of registrations per unit time on the same circuit or other defenses can be employed by the registration server.

The customer database or registry 368 may be accessed with an Open Data Base Connectivity (ODBC) driver. The installation can modify the customer database to insert registration verification fields. Data fields may be universal transformation format (UTF)-8 or UNICODE (UNICODE is a standard similar to ASCII representing characters as integers). The following fields may be included in the CM registry 368 for authentication purposes:

| Field Name | Description | Data type and Size | Unique |
|---|---|---|---|
| Circuit ID | DSLAM circuit ID or connection port reported by DHCP/relay-agent | Free format string N (34 characters in sample) | Yes - Circuit is made unique by prepending relay agent address |
| Remote ID | STB unique remote identifier. | Dynamic range of MAC address 48 bit in dashed hex string | Yes |
| Warning Count | Accumulator used to count number of clone warnings against the STB. Used for report alert thresholding and trend. | INT | N/A |
| Control | Enumerated control field used for network operator white list, black list, and warning suppression preferences | ENUM | N/A |

Using these fields, the network operator can build ad-hoc surveillance reports to trend by line, locale, subnet, and so on.

A DHCP IP lease may expire between the time the lease files are harvested by the lease table builder, and the time they are employed by the registration server. The registration or authentication server can defer boundary case filtering to the sweep report rules, by writing the DHCP lease expiration and time-of-day along with other relevant fields to the Authentication Exception table 375. The sweep report logic can test these fields to account for these boundary cases. Granted keys may be leased with an expiration time.

The authentication system is designed for general compatibility with a content authority service (CAS) and may be integrated with Simple Object Access Protocol (SOAP) agent to provide SOAP/extensible markup language (XML) to remote procedure call (RPC) translation. The authentication system can run in a demilitarized zone (DMZ) isolated from threat of attack. A DMZ is a computer or small sub-network that sits between a trusted internal network, such as a corporate private local area network (LAN), and an untrusted external network, such as the public Internet. Generally the DHCP server and relay agent have a trusted relationship, while the DHCP client (CPE equipment including STB) is assumed to be untrusted. In one embodiment, the authentication system is protected from un-authorized use by a license key. Administration level functions are restricted to Shift Supervisor login.

The user interface for the authentication system may be implemented in Java or similar Internet programming language, and include the following functionality:

| Control | Description | Notes |
| --- | --- | --- |
| DHCP Server List | List control to populate, checkbox enable and disable DHCP servers. | Initial controls are manual, may be augmented by DHCP discovery. |
| DHCP Table Builder recurrence | Chron controls (time and frequency of operation), and checkbox enable/disable | Controls when system executes DHCP table builder to harvest DHCP leases files |
| Sweep Preferences | Reporting thresholds, suppress lease expiration checkbox, etc | |
| Sweep Report | List control generated by authentication or security server showing sweep summary, noting any flagged STB. | Include white list suppress alarm for STB under system maintenance |
| Admin | Enable or Bypass Circuit Authentication. Scrub Authentication Exception Table Rebuild DHCP Leases Table | Shift supervisor level protected by username and password. |

The authentication system installation can include an updated registration authority server that implements circuit based authentication, along with the associated software. Database schemes and new tables are updated/created as part of the installation. In a Windows operating system, Installshield EXE creates a new Windows Service. For a Solaris/Linux system, the solution should be installable as a tape archive (TAR), Red-hat Package Manager (RPM), or the like. If the authentication service is a separately licensed option, it may be added with a unique LICENSE_KEY in order to manage the installation and uninstallation of the authentication service. Uninstallation may be permitted in some cases to restore CM database to pre-authentication state, deleting authentication service related tables and fields.

The proposed solution minimizes or reduces impact to real-time registration, and defers off-line processing to the DHCP Leases table builder and sweep reporting. Sweep report execution time is a function of the number of Authentication Exception records, and is run interactively (ad-hoc) or possibly on a daily reporting cycle. The DHCP Leases table 367 can include all CPE IP leases issued for the entire served interactive network. Worst case large installations may have 1M CPE served. Assuming each has a leased IP, then the leases table is on order of 1M records. The primary service-affecting or operational impact of authentication system is at the registration or authentication stage. In the event that the DHCP leases table is offline, an IP address lookup fails, or Authentication Exceptions update fails, the system should recover and fall back to current functionality. The authentication system may be separately licensed, and can be backward compatible with both non-authentication and authentication-aware business logic.

The DHCP Leases Table builder 365 can process copies of DHCP leases files, leaving the live leases files in storage module or modules 364 untouched. The build process is not service-affecting. The Leases Table 367 may be rebuilt from scratch on a recurring cycle, so that it is self-healing.

Sweep reporting using the Authentication Exception table may be offline and not service-affecting. A fault in the exceptions table or reporting can be recovered through scheduled database maintenance. Regular scheduled maintenance of the Authentications Exception table can scrub aged records.

The DHCP .leases file can be collected into a central network file system (NFS) exported directory for processing. The total set of all DHCP server .leases files may be scanned to check for cloned STB. DHCP leases files may be pushed by the DHCP servers to a central collection point on a periodic basis, or pulled by the table builder by various means (FTP, Network File System (NFS), etc.).

The DHCP may report the Agent Circuit ID value of current leases in statistical reports (including its MIB (management information block)) and in logs. Since the Circuit ID is local only to a particular relay agent, a circuit ID may be qualified with the giaddr value that identifies the relay agent. In the event that circuit information is not currently written to leases file, the DHCP server and/or relay agent can have to be enhanced. The remote ID may be the DSL modem ID.

In the system described above, identification of a physical network connection ID associated with a building as implemented in a computer data structure or database record is used to authenticate one or more network devices in the building, so that secure network communications are directly associated with a building owner or occupant. This is done by associating a subscriber with a physical connection ID to a building at the time they sign up for service, and then checking that subsequent service requests by the subscriber come from the same physical connection ID. Since the building cannot move, this provides a basis for relying on the authenticity of the user.

Figure 5:
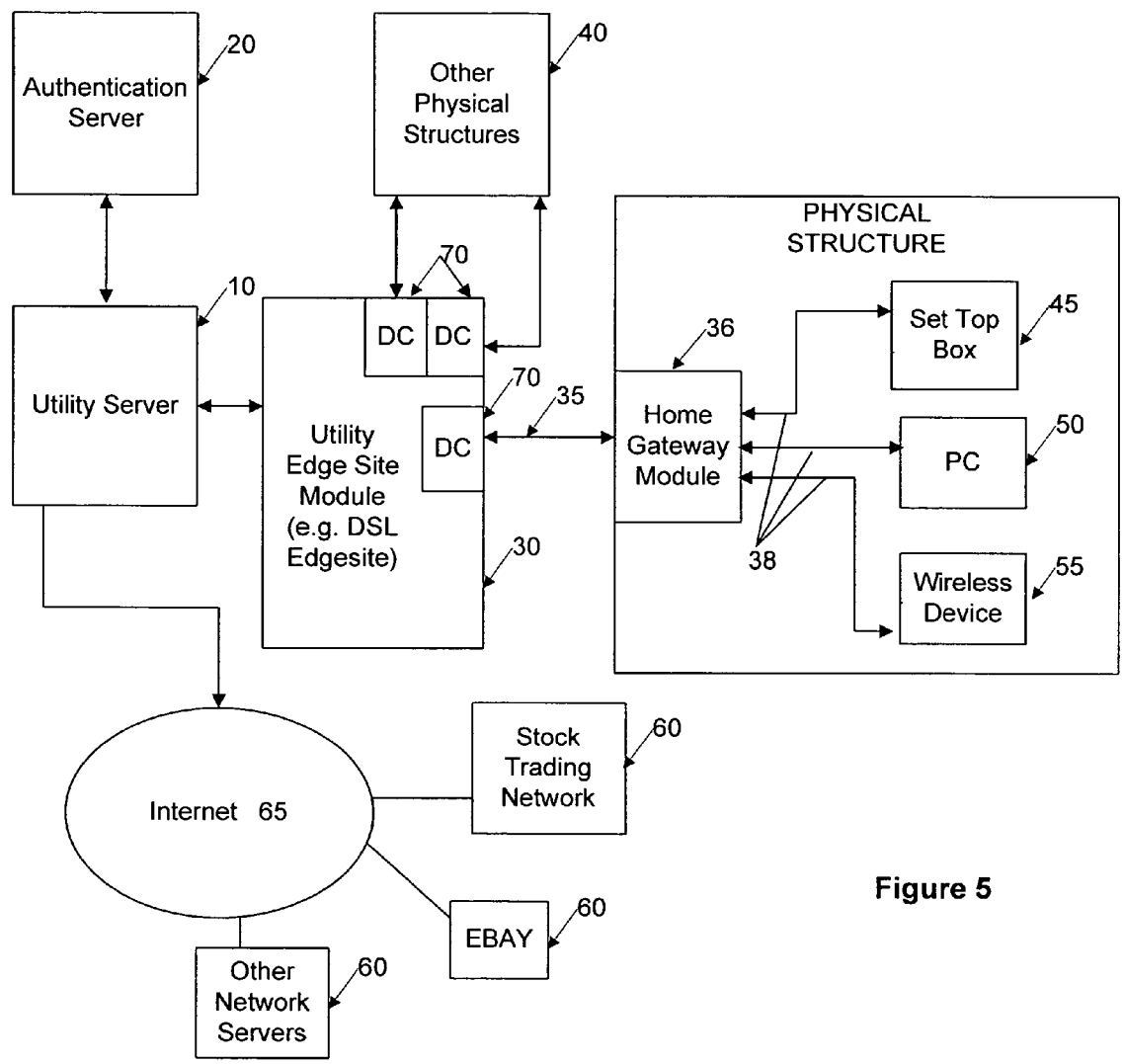
FIG. 5 is a block diagram illustrating an authentication system according to another embodiment of the invention.

FIG. 5 illustrates an authentication system according to another embodiment of the invention which also relies on physical component or connection to a building for authentication, but uses a digital certificate to identify the connection, adding another layer of security to the system. The authentication system is "piggy-backed" on an existing, physically secure, two way network, for example a utility network such as a telephone company having dedicated lines to specific homes and buildings. However, a separate, stand-alone authentication system may be provided in alternative embodiments. In FIG. 5, the authentication system is piggy-backed or added to an existing digital subscriber line (DSL) service of a telephone company. This system may alternatively be used in conjunction with other services providing broadband wire connections to buildings, such as cable service providers, power companies, FTTH, and the like.

The system of FIG. 5 is managed by a utility server or data center 10 which is linked to a certified authentication center 20 which can be trusted to perform authentication services. In this embodiment, the authentication center or server may be a well-known certificate authority such as Verisign, Thawt, or Baltimore. Other entities can participate as well as long as they can similarly be certified as being trusted. In an alternative embodiment, the utility data center 10 and authentication center 20 can be combined as a single entity, with the utility server performing the trusted authentication services. However, utilities are not generally known for being qualified to perform authentication functions, so the system in the illustrated embodiment uses a separate authentication service.

The utility server or data center 10 is connected to various utility company edge sites or service boxes 30, which in turn are connected by dedicated physical communication lines 35 to gateway modules 36 in each home or building 40 subscribing to the service. In this case, the communication lines 35 are essentially secure components each connected to a specific building. The home gateway modules 36 in turn are linked by wired or wireless communication links 38 to various user devices in the building, such as set top boxes or televisions 45, personal computers or laptop computers 50, and various types of carrier based wireless devices 55. Each communication link 38 is connected to only one building or physical location.

The term carrier based wireless device describes a client device or other device that connects to a wireless network. The wireless network can be an open network that anyone can connect to such as an Institute of Electrical and Electronics Engineers (IEEE) 802.11 or a service offered by a service provider such as cellular phone company or other wireless communications carrier or wireless communications equipment. Examples of carrier based wireless device are cellular phones, wireless modems, wireless PDA, and other wireless devices. Audio and video playback and web browser applications are example applications that would run on a carrier based wireless device. Other applications running on carrier-based wireless devices are also envisioned and may benefit from the authentication methods described herein.

The gateway module 36 in this embodiment is equivalent to the customer premises equipment (CPE) 380 in the previous embodiment and may be any device that terminates or interfaces a Telco signal to a network. Examples of home gateway modules include DSL modems, cable modems, fiber modems, wireless modems, dedicated phone connections such as T1 devices, and other devices that interface a communication line to a network. Home gateway module 36 can include multiple communications, modem-type functions, and may include NAT, internal-to-the-home DHCP server, firewalls, and other network functions such as a VPN, wireless access point, and the like. The terms home gateway or CPE are generic descriptors for any of the above items and can include unique identifiers such as a DSL modem identifier, a Data Over Cable Service Interface Specification (DOCSIS) identifier, a Basic Line Privacy Interface (BPI+) or other identifier, in addition to the network functions described above.

In the illustrated embodiment, the user devices in the building are linked via the utility server to content providers and other users 60 via the Internet 65 or private networks (not illustrated). However, connection to the outside world via the utility server is not essential, and the authentication system of FIG. 5 may alternatively be used only to authenticate the user building. The building or physical structure 40 may have other broadband wire and wireless connections to various other sites for sending and receiving data.

The utility edge site modules 30 are physical structures within discrete communities that are responsible to connect homes and buildings to the network backbone. In the exemplary embodiment of FIG. 5, each edge site module 30 comprises a secure control unit associated with the secure component or line 35 connected to each building in a neighborhood. Edge site module 30 has sufficient physical security means and mechanisms to make sure that the edge site module itself cannot be compromised by having a resident walk in and hack the systems. When the edge site module is a DSL edge site, it can contain a digital subscriber line access multiplexer (DSLAM) for directing communications to and from each building to which it is connected via the associated dedicated line 35, and can also contain control modules forming part of the authentication system, as described in more detail below.

The edge site module 30 has two levels of security as follows:

1. The Edge Site itself is physically secured and access is limited to authorized personnel only, who should make their entry and exit known to the data center 10 and possibly also to the authentication server.

2. The DSLAM servers (and the servers that are used to support the DSLAMs) are physically secured as well. The DSLAMS may have their own independent security means and devices that are separate from the security means and devices used to keep people out of the Edge Site's physical structure.

In the embodiment of FIGS. 1 to 4, user certification or authentication relies on establishing an association between a registered user and a physical line connecting a home or building to a network edge site. The association is created by determining the subscribers physical network connection ID, both on registration and when the registered subscriber subsequently uses the service. In the embodiment of FIG. 5, rather than identifying a connection or circuit ID for the unique communication line 35 to a building using various sources such as DHCP lease tables, an additional security credential is associated with the building or with the physical connection to a building. The security credential may be a digital certificate. In one embodiment, each edge site module 30 contains individual digital certificates 70 that are issued to each discrete physical structure 40 in the community served by that edge site module by way of one or more communication lines 35 that link the edge site module 70 to the physical structure 40. The digital certificates are stored in a data storage area. The edge site module can also have long term memory containing cryptographic routines used for authentication purposes. An additional processor programmed to carry out the necessary authentication steps may be added to the edge site module, or these functions may be carried out by the existing edge site processor if adequate.

The authentication system of this embodiment uses the Public Key Infrastructure (PKI) to issue and revoke digital certificates 70, which are immutable software objects. These digital certificates are envelopes that carry two unique keys. These two keys are different from one another. One key is the cryptographic reverse of the other. If one key is used to encrypt a packet of data, the only other key in the universe that can successfully unencrypt the packet is the other key kept within the digital certificate. One key is typically called the public key and the other key is typically called the private key. The private key is always securely attached to the immutable object. The public key is shared among the users and prospective network partners.

Once a digital certificate 70 has been issued by the certificate authority or authentication server 20 to a particular building (or the secure component, i.e., line 35 attached to the building) which is the immutable object in this case, the following steps may be used to authenticate the network user in the building:

User encrypts data packet using a private key and sends the encrypted data packet and the un-encrypted (clear text) data packet to another network user;

Recipient receives both data packets and uses the counterpart public key associated with that user building from the certificate authority 20 to un-encrypt the previously encrypted data packet;

Recipient performs an operation to match the un-encrypted data packet with the clear text data packet;

If the match operation is successful, then the remote network user is authenticated.

In this embodiment, by tying the digital certificate used in this authentication procedure to a specific building that cannot be moved, or to a secure component attached to the specific building which can be verified, a higher level of security is provided. This is unlike previous uses of such digital certificates, where the certificate was tied to physical components that could be moved, for example by means of a Universal Serial Bus (USB) dongle or the like sent by the certificate authority to a user for installation in a hardware device such as a computer. The association of a digital certificate with a physical connection 35 or 305 (FIG. 1) may be used instead of, or in addition to, the techniques described above in connection with the first embodiment, in which a physical connection identifier is located and stored for authentication of a registered user.

The edge site digital certificate that is dedicated to a specific building is matched with corresponding keys stored securely within the building, for example in the home gateway module 36. Protection mechanisms are provided that can guarantee that a device such as home gateway module 36 cannot be moved to another physical location and still successfully authenticate the user. Known cryptographic systems can create standards and systems for linking immutable objects with an error rate that is astronomically low. In other words, as long as the component parts (in this case the edge site module, line 35, and home gateway module) are immutable, mathematics can be used to ensure that the linkage between the component parts is virtually perfect.

Since each digital certificate 70 is associated with a fixed physical structure (or a discrete connection to just that fixed physical structure), this system allows trustworthy authentication of an actual user who owns, lives or works in the physical structure or building, rather than just authentication of a user device, which does not identify or guarantee the authenticity of the actual user of the device. Each digital certificate can have its own private key specific to only one communication line and thus one physical site.

The physical communication line 35 between the edge site module 30 and the physical structure 40 may be a physical wire connection such as twisted pair (copper) line, DSL lines, fiber line, a dedicated and discrete wireless connection, or other dedicated ports or connections or dedicated lines that perform similarly dedicated functions. The authentication service 20 can issue and revoke digital certificates within the various edge site modules in a community for the purposes of authenticating the physical structures throughout the community. The digital certificates may be X.509 digital certificates which carry two unique keys. X.509 is a specification for digital certificates published by the ITU-T (International Telecommunications Union-Telecommunication).

Other homes and office buildings can be assigned their own discrete digital certificates. Therefore, an entire community can have access to this system and method of authentication.

Where the communication line 35 is a DSL line, it can typically be connected to a home gateway module 36 for providing DSL communications to and from user devices in the building. Alternatively, gateway module 36 may be a simple router connected to user devices in the home, or an enhanced router for managing the flow of data for the end user. In another embodiment, one or more user devices in the building may be connected directly to the communication line 35 and thus to the digital certificate.

Once a digital certificate 70 has been set up for a particular building, it can also be used to authenticate user devices within the building. Although the digital certificate is not securely attached to the building itself in this embodiment, it is securely attached to a dedicated access line for that particular building within the DSLAM or other server at a provider edge site module 30. This is all that is necessary, since the DSLAM is maintained within a physically secure edge site and there is confirmation that it is dedicated to the correct building, both because service is being delivered by the dedicated access line to that building, and because there is a history of payment for services rendered by users in the building. This system, which "piggy backs" on an existing network, is much less expensive to set up than an authentication system requiring its own network and attachment of physically secure boxes with two way network connectivity to each building subscribing to the authentication service.

The embodiment of FIG. 5 provides a virtual private network using the public key infrastructure (PKI) or equivalent for the purpose of issuing X.509 digital certificates 70 (or similar authentication certificates) which are each associated with a fixed physical location on Earth, rather than with a mobile or relatively mobile user device which may be moved, stolen, cloned, or the like. This allows secure, two-way authentication for e-commerce, email, and other electronic transactions. The systems of FIGS. 1 to 5 utilize existing hardware, software and private networks of utility companies such as telephone, electric power companies, cable television companies or the like as the basis for the client authentication system. All required authentication system hardware and software is added to the existing hardware and software at each location in the network as necessary. This can considerably reduce initial set up expense. However, these systems may alternatively be set up as a stand alone, independent client authentication system having its own private network, authentication servers and data bases, with network service providers using the system for registration and subscriber authentication purposes. This would be particularly feasible in the case of new building developments.

Figure 6:
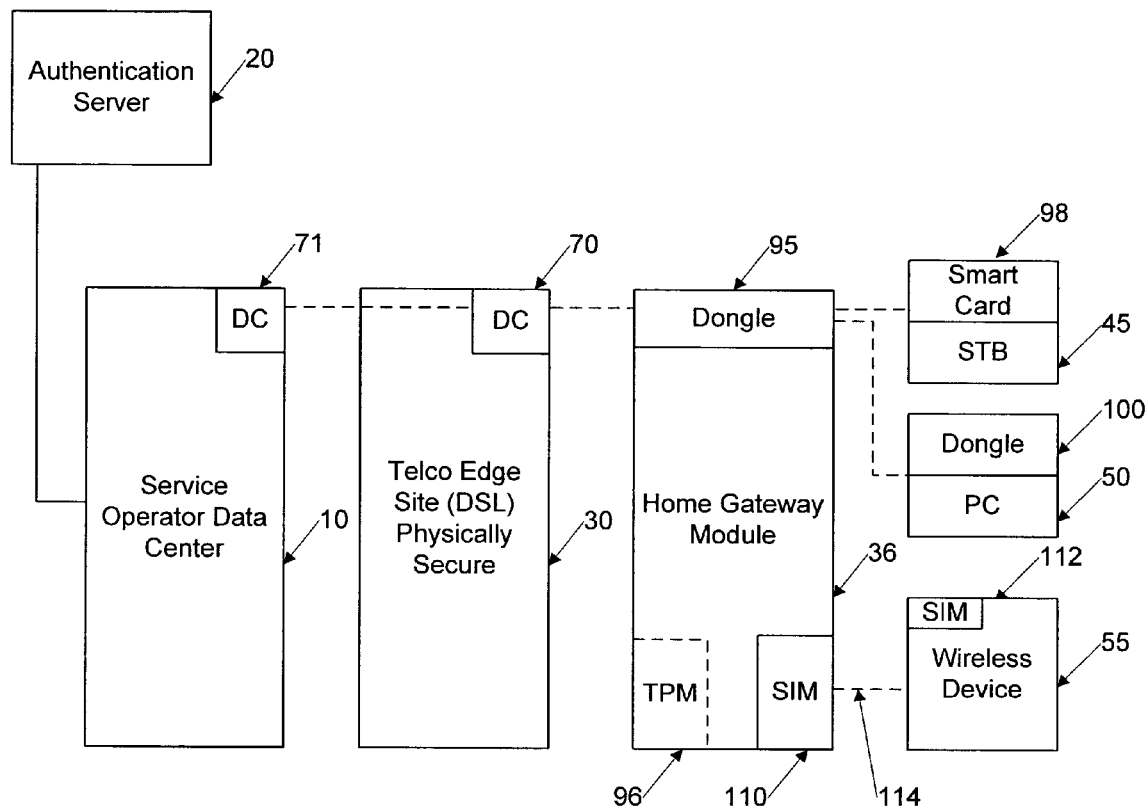
FIG. 6 is a block diagram illustrating a modification of the system of FIG. 5 to provide a second level of authentication.

FIG. 5 illustrates a one level authentication system and method in which a certificate authority authenticates a home or other physical structure 40 in which user electronic devices are located. The user devices may also be authenticated to the secure component attached to the building, in a two level authentication system as illustrated in FIG. 6. In this system, the certificate authority 20 provides a digital certificate 70 which authenticates the physical location of the building (or the location of a secure component attached to the building, such as a line 35 connected to the building, a connection port in the building, a home gateway module 36 attached to the line 35, or the like) with which the digital certificate is associated. This is the first level of authentication. In the second level of authentication, home gateway module 36 in turn authenticates each user device in the building. FIG. 6 illustrates a two level authentication system for the embodiment of FIG. 5, but a similar system may be employed in the embodiment of FIGS. 1 to 4, with suitable additional hardware and software as illustrated in FIG. 5.

In the embodiment of FIG. 5, home gateway module 36 may have keys corresponding to the edge site digital certificate 70 associated with its specific building stored in a data storage module. As illustrated in FIG. 5, the utility company (such as the telephone company or Telco) or the trusted certificate authority may alternatively supply a hardware security element containing the counterpart digital certificate to digital certificate 70 to the building user. The hardware security element may be a USB dongle 95 or any other hardware security element such as a security chip, trusted platform module (TPM), smart card, or the like. A TPM is used to provide hardware-based security to a computer device. Typically, a TPM includes cryptographic hardware embedded within a chip or a separate hardware module. In the embodiment of FIG. 4, a secure USB dongle 95 is installed in the home gateway module 36.

In the embodiment of FIG. 5, in order for network communications to operate normally, cryptographic "signing" functions can be performed successfully between the home gateway module 36 and the telephone company edge site digital certificate 70 in order for the authentication functions to yield a positive result. This can ensure that the assigned home gateway module 36 (or other type of router device) does not work at a different physical location. The cryptographic signing functions may be carried out using suitable cryptographic software, for example software provided by the company RSA Security of Bedford, Mass. This company has methods, techniques, and algorithms for guaranteeing that counterpart digital certificates are properly matched before network activities can be successfully performed. RSA-style authentication procedures may be used in each of the embodiments described herein. In one embodiment, the digital certificate authentication procedures are used to verify that authorized equipment has not been moved from one physical location to another.

Instead of dongle 95, the system may employ TPM 96 in the home gateway module, as indicated in dotted outline in FIG. 5. Any suitable hardware security element may be used in place of dongle 95 or TPM 96 in order to securely associate the home gateway module with the digital certificate 70, such as smart cards, secure chip technologies, and the like.

Similar hardware or software security devices are provided in each user device associated with the building. For example, the set top box 45 may have a hardware based security element such as a smart card 98 which contains the counterpart digital certificate to certificate 70. Smart card 98 may alternatively be replaced by a dongle, secure chip, or the like. The personal computer 50 may have a hardware based security element such as dongle 100 illustrated in FIG. 5, or a smart card, TPM, secure chip or the like, which also contains the counterpart to digital certificate 70.

In order to support wireless devices 55, the home gateway module 36 may have its own subscriber identity module or SIM 110, which can enable secure communications with all wireless devices 55 belonging to the building owner and/or building occupants. A SIM card or chip contains secure memory that stores customer account or credit information. Each wireless device in turn can have a SIM card 112 which is configured to communicate with the SIM card of the home gateway module only, through a secure tunnel or link 114 using secure sockets layer (SSL) or similar technologies. Subscriber Identifications Module optionally used in a carrier based wireless device that stores the service identifications for the device and optionally service billing credits or other accounting information. Typically a SIM is a secure cryptographic processor used to identify a subscriber. Secure tunnel 114 can be based on a Virtual Private Network (VPN), IPSec, or an SSL tunnel or other authenticated and encrypted communications link, or private internal communications link such as that described by this invention. The secure tunnel can be a virtual tunnel between two network endpoints connected between wired and wireless communications paths.

On initial set up of the system, or whenever a new user device is added, each user device is authenticated by the home gateway module 36 to cryptographically associate the security element 98, 100, 112 of the user device with the same digital certificate 70 which is associated with dongle 95 or TPM 96 and SIM card 110. Similar measures may be used in the embodiment of FIG. 5 to associate each user device with the digital certificate 70 stored in home unit 80. This provides a second level of authentication of building home unit or gateway to user device.

In the embodiments of FIGS. 5 and 6 the equipment in the building only communicates through the digital certificate that has been assigned to the building at the DSLAM edge sit 30. Therefore, the following communication path is implemented:

DSLAM Edge Site 1→DSLAM Digital Certificate 1→Building 1

DSLAM Edge Site 2→DSLAM Digital Certificate 2→Building 2

DSLAM Edge Site 3→DSLAM Digital Certificate 3→Building 3.

In one embodiment, Building 2 cannot communicate with DSLAM Digital Certificate 1 or 3, while building 3 cannot communicate with DSLAM Digital Certificate 1 or 2 (or any other Digital Certificate other than Digital Certificate 3). Therefore, each building or physical structure can only communicate through its own digital certificate.

In one embodiment, as illustrated in FIG. 5, the Telco or utility data center 10 also has an associated digital certificate 71. The digital certificate 71 can be unique for each edge site 30 to which the data center is connected, or can be associated with a single or multiple Telco data centers. All of the security elements in each path, such as the path illustrated in FIG. 5, can be aligned and synchronized cryptographically in order for the authentication function to yield a positive result and for normal network communications to take place. In other words, the host digital certificate 71, the edge site digital certificate 70, the home gateway dongle 95 or TPM 96, and the STB smart card can be cryptographically synchronized for pay television services or movies to be provided. Similarly, host or service operator digital certificate 71, edge site digital certificate 70, home gateway dongle 95 or TPM 96, and PC dongle 100 can be cryptographically aligned and synchronized for secure public network communications between the PC and other network servers or users 60 to be enabled. Finally, host or service operator digital certificate 71, edge site digital certificate 70, home gateway SIM chip 110, and wireless device SIM chip 112 can be cryptographically aligned and synchronized for wireless communications to take place. If the hardware security elements are tampered with or removed from the user devices and taken elsewhere, the cryptographic alignment is not possible, since the security elements can no longer connect to the appropriate home gateway security element. All network traffic depends on successful RSA style authentication procedures between the digital certificate and security dongle 95 or TPM 96 at the home gateway module before any other network procedures can take place.

Figure 7:
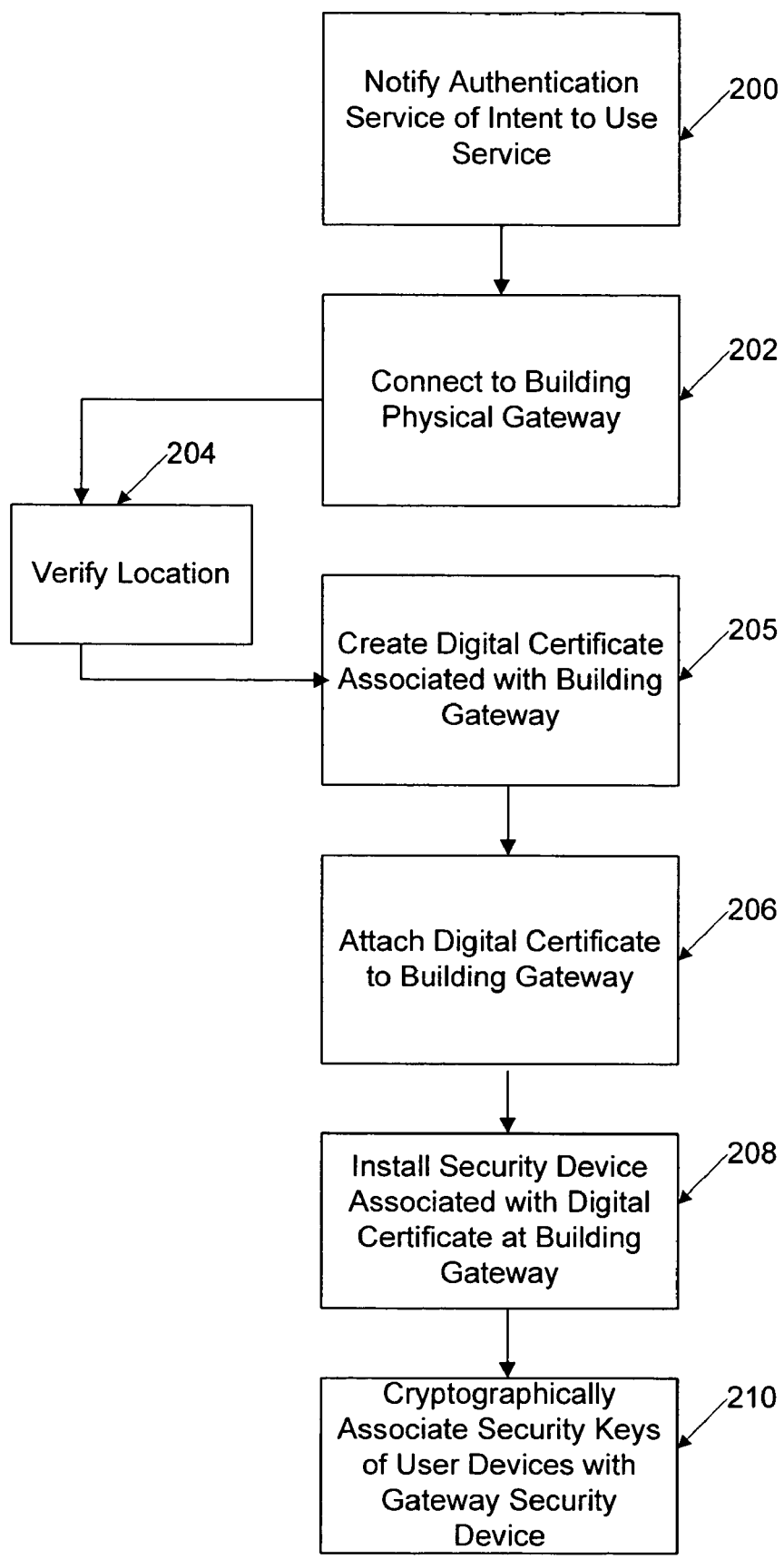
FIG. 7 is a flow diagram illustrating initial set up of the authentication system of FIGS. 5 and 6.

FIG. 7 is a flow diagram illustrating an authentication method using the system of FIGS. 5 and 6. In the first step 200, a prospective user or client notifies the authentication service (which may be provided by the utility company or may be a stand-alone authentication service provider 20) of their intent to use the service. The authentication server 20 then attempts to connect to the building in which the prospective user is located (step 202), using the associated private network, such as a telephone company or other service provider network, or a dedicated authentication network in alternative embodiments. Where a telephone company network is used as part of the authentication system, the authentication service 20 attempts to connect to the building through the telephone company operations center or data center 10, the telephone company edge site 30 associated with the building 40 where the prospective user is located, and the dedicated line 35 connecting that edge site to the home gateway module 36 of that building. If connection is successful, the physical location of the building is verified (204), using records stored by the telephone company for that address and/or a location sensor, if provided. A unique digital certificate 70 is then created using known PKI techniques (205), and this digital certificate 70 is associated with the building in authentication records stored in a data base at the remote authentication service 20. In step 206, the unique digital certificate 70 is provided to the edge site 30 and is stored in permanent memory at the edge site 30 or in building gateway module 36. This is the first level of authentication as illustrated in the system of FIG. 4.

The second level of authentication may then be carried out. A hardware-based security device which is associated with the unique digital certificate and contains the keys for that certificate is provided to the service user at the building address, and is installed by the user in the building gateway module (step 208). This security device can only be verified if it is installed in gateway module 36 which is physically connected to the dedicated line or link 35 to that building address, so it is useless to anyone who attempts to steal and relocate it. Security devices are also provided for installation on each user device at the building location, and the security keys of these devices are cryptographically associated with the security device 95, 96 or 110 of gateway module 36 in step 210. Again, these security devices can only be verified if the devices are locally connected to the appropriate device in gateway module 36, so that they cannot be used in any other situation. This means that all secure network communications using digital certificate 70 can be reliably associated with only one physical structure having identifiable occupants and/or owners. A chain of trust can then exist from the network to the structure 40, and from the structure 40 to the user devices and associated users.

A high degree of granularity can easily be achieved with this system. Where a building has a number of tenants, each tenant can have his or her own digital certificate that is issued based on a tree structure where the landlord or building owner is the "parent" branch. The authentication model can then be: Network→Structure→Landlord→Tenant. This tree structure can be extended almost indefinitely. For example, in cases where people have no physical address to which they can associate themselves and connect to an authentication server via a virtual private network, it would be possible to permit association with an existing physical address for a fee. Such a service may take extra measures to verify the subscribers outside the building, for example after a successful interview process as currently used by companies such as Verisign.

Figure 8:
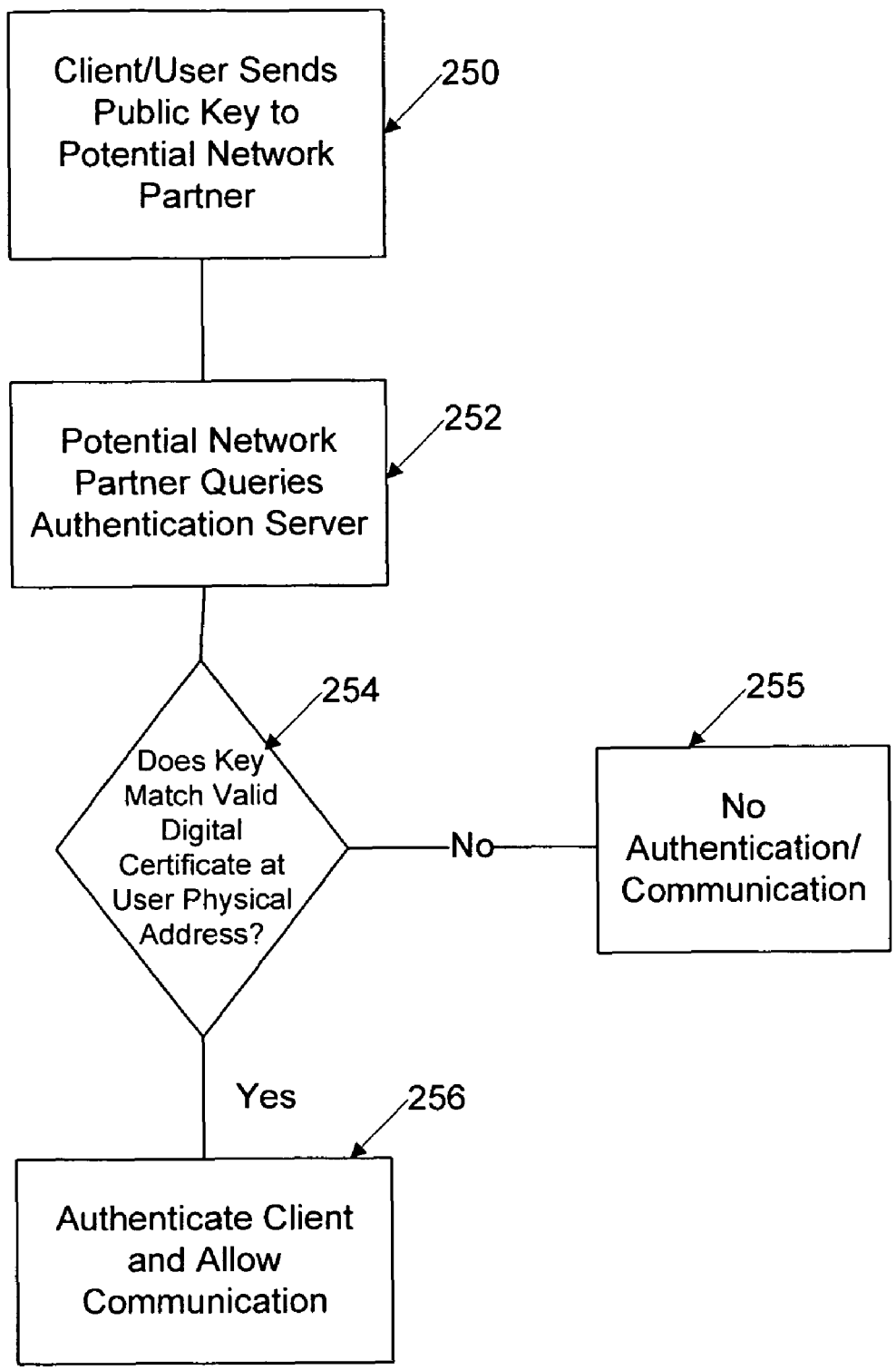
FIG. 8 is a flow diagram illustrating use of an authentication system in an embodiment of the invention to authenticate potential network partners who are clients of the system.

FIG. 8 is a flow diagram illustrating the authentication steps carried out when a user who subscribes to the authentication service wishes to carry out secure communications with a potential network partner having a network server 60, for example for commercial purposes such as secure financial transactions or purchases, secure email communications, and the like. The system provides the user with an option of operating inside or outside the secure network, for example by adjusting a preference setting in each network application to turn the authentication system on or off. Where authentication is not needed, for example if the user is simply surfing the Internet for information, the user may opt not to activate the authentication service. When the security or authentication service is activated, the user can send the public key of the digital certificate to the potential network partner (step 250). This can be sent either through the private network, private network utility server 10, public network or Internet 65 to the selected network partner 60, or may be sent directly through another connection from the building 40 to the public network 65 (for example as illustrated in the alternative embodiment of FIG. 9). Similar direct wire and wireless connections out of the building to the Internet and other public or private networks may be provided in the embodiment of FIG. 1.

In one embodiment, the authentication service user may be required to enter a user name and password in order to access the authentication service. This provides an additional level of security to the authentication system. The three levels of security provided in this embodiment are: (i) What you know (i.e., username and password); (ii) What you have (i.e., Hardware security element or elements such as USB dongles and the like); and (iii) Who you are (digital certificate attached to building or physical structure provides secure identification of source). In the embodiment of FIGS. 1 to 4, the third level of security (who you are) is provided by identifying the physical connection to the building, such as an existing IP address port number.

After receiving the public key, the potential network partner then queries the authentication server 10 to determine the validity of the key (step 252). The authentication server can verify whether or not the key matches a valid digital certificate 70 associated with the building physical address or location (step 254), and may also take steps to verify that the authorized equipment has not been moved from one physical location to another, for example by contacting the equipment via the private network through the edge site module and line 35. If the verification is successful, normal network communications are permitted (256). If verification is unsuccessful, communications are not permitted (255).

Figure 9:
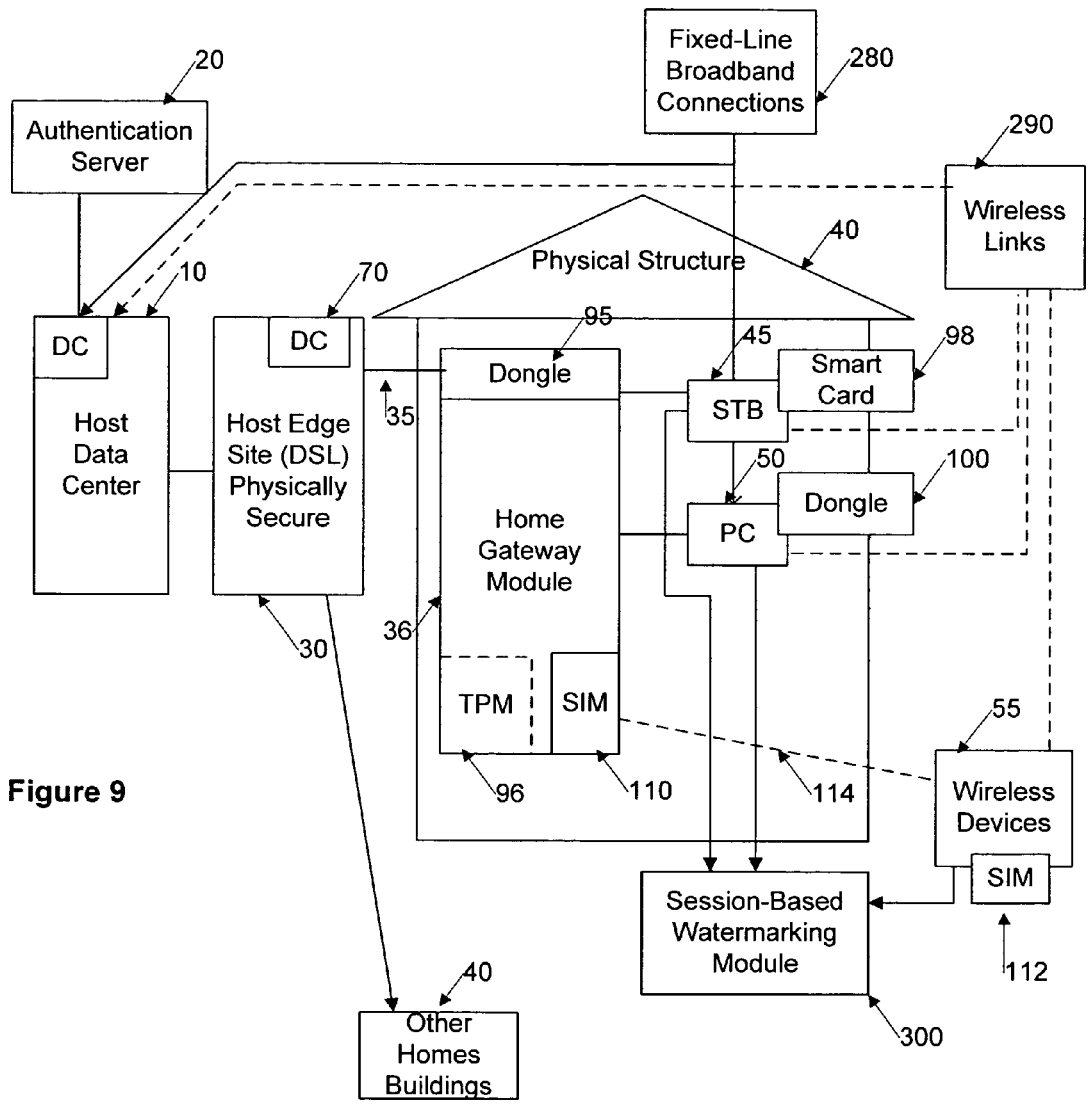
FIG. 9 is a block diagram illustrating a modified authentication system providing watermarking of content files.

FIG. 9 illustrates a modification of the system of FIGS. 4 and 5 to provide another level of security. This additional security level may also be provided in the system of FIGS. 1 to 4. In the embodiment of FIG. 9, user devices 45, 50 are connected through the home gateway module to the dedicated line 35 between the building 40 and the edge site 30, and may use this line to access other networks linked to the host network (as illustrated in FIG. 1). The building 40 may have other fixed line broadband connections 280 and user devices may also obtain and send data content files and otherwise communicate via these connections. In this case, any high value content received via the fixed line broadband connections 280 would have to be encrypted for security. High value content would not normally be passed to the STB or PC in the clear (i.e., outside the secure private network of FIG. 9). The fixed line broadband connection 280 is shown for systems that may not provide actual Internet services such as cable networks that do not include Internet. However, for many applications, fixed line broadband connection 280 is provided only by communication line 35.

Wireless devices 55 may receive and send communications via high speed wireless links or sources 290. This represents a wireless network or service such as IEEE 802.11 or a service offered by a provider such as a cellular phone company, or other wireless communications carrier or wireless communication equipment that provides a wireless connection to a network or communications port. Where the wireless devices subscribe to wireless services from other carriers, such as cellular phone service providers, which have their own methods to authenticate subscribers, the method of this invention provides more authentication and security to the network overall. However, a separate wireless carrier is not required by the system and method of this invention.

In the modified embodiment of FIG. 9, a session-based watermarking software module 300 is installed on each user device 45, 50, 55, such as each set top box, computer, and wireless device in the building.

Session-based watermarking software is used to positively identify acts of hacking, looting, and piracy that are taking place with content files that are being streamed or downloaded into the physical structure 40. The software places a discrete and unique watermark payload into content downloaded by the user. The payload of the watermark is a client-specific identifier (or transactional ID or the like) that can be used to identify the client player device (STB, PC, PDA, cell phone, etc.) that was used to access and play content. The watermark payload may be cryptographically signed with the user's private key from the unique digital certificate, to provide further proof of exactly where the content was delivered. This can allow the user to be identified should they attempt unauthorized distribution of the content to others.

In an alternative embodiment, the session based watermarking software can be placed within the content servers that are located at the host or telephone company data center or server 10. Since each stream or download is dedicated to a discrete physical structure and a discrete device 45, 50 or 55, the unique watermark payloads inserted at the host data center 10 would be sufficient as a deterrent to digital piracy from within physical structure 40. This alternative requires that the download is directed through the host data center to the building, and not directly into another connection to the building. The cryptographic signature in the watermark payload using the consumer's private key can be implement to provide further proof that the user or consumer requested the content delivery and has taken full responsibility for the protection of the content. This is a useful deterrent in keeping content from being uploaded onto popular public sharing sites.

It is recommended that all watermarking occur on a session basis. This means that each individual content stream or download is marked uniquely. In the first alternative watermarking method described above, the client or user devices themselves can insert a unique watermark into each stream or download that reaches the device. In the second alternative, the content server systems can insert a unique watermark into each stream or download that targets a specific device (and no other).

In addition, the payloads within the watermarks are cryptographically authenticated using the keys that are available to the system. In one embodiment, a digital signature is added to the watermark payload, i.e., the watermark payload is cryptographically "signed" by a private key used by the client. Other methods such as "hashing" and the use of session keys can be used as well. This extra step of authenticating the watermark payload can further prove the authenticity and the culpability of the person who was responsible for the content leakage from within their home or building. The term digital signature when used in this application includes any and all techniques used by a sending or receiving party, or that can be used in a transmission path to create a unique cryptographic signature or identifier that can be authenticated by a receiving party, certificate authority, or other party. There are many forms of digital signatures available including using PKI encryption on a message hash or message digest, message digests such as Message Digest 5 (MD5), US Secure Hash Algorithm (SHA1), and other digital signature technology based on cryptographic techniques. Any type of digital signature can be utilized for the digital signature and any form of currently secure digital signature or a future digital signature technique can be utilized.

Even with the most secure environment, it is always possible that the content might escape the network and become publicly available without the consent of the content owner. Although this is unlikely, it is important to anticipate that acts of piracy and hacking may occur in some instances. Therefore, it is advantageous to use steganographic technologies and procedures such as session-based watermarking to place invisible marks within the content files so as to positively identify people responsible for unauthorized content leakage.

One possible application of the system of FIG. 9 is in permitting subscribers to download early release or high definition (HD) movies or the like. Major motion picture studios and the like have been reluctant to make their high value digital content available to consumers over the Internet, due to the substantial risk of digital piracy. Consumer electronics companies have also been reluctant to adopt hardware and software technology that makes it harder to steal valuable content, since this can increase the price of the consumer electronics device. This means that virtually no personal computers are approved for HD content. The primary reason for this is that HD movies can be easily uploaded to the Internet from a personal computer and offered to anyone in the world equipped with a network connection. Since there is a high level of anonymity on the Internet, digital pirates can perform these upload operations with impunity. The authentication system of FIG. 9 with added session-based watermarking software may be a viable way to overcome these problems and allow valuable digital content to be purchased over the Internet for viewing on authenticated user devices, with little or no risk of unauthorized further distribution of the content. The network architecture of this invention positively authenticates network users at the time the network user wants to consume the valuable product. If this network user decides to post the content file on a publicly available network (or enters into another similar illegal act), he or she risks being caught, since they can be identified based on the watermark added to the content file. This is a significant deterrent to acts of digital piracy or unauthorized distribution of valuable digital content such as HD movies, as well as an incentive for people to utilize, and pay for, the legal offerings of such content.

Figure 10:
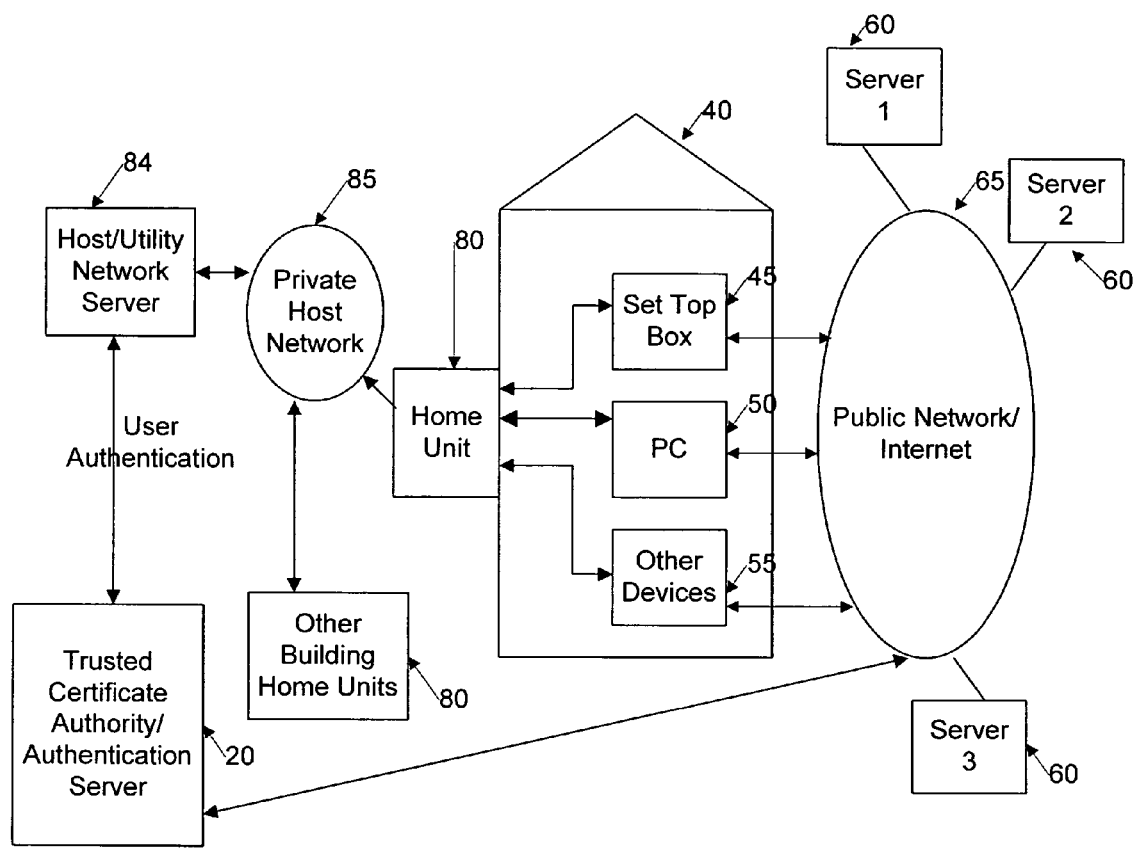
FIG. 10 is a block diagram illustrating a modified authentication system according to another embodiment of the invention.
Figure 11:
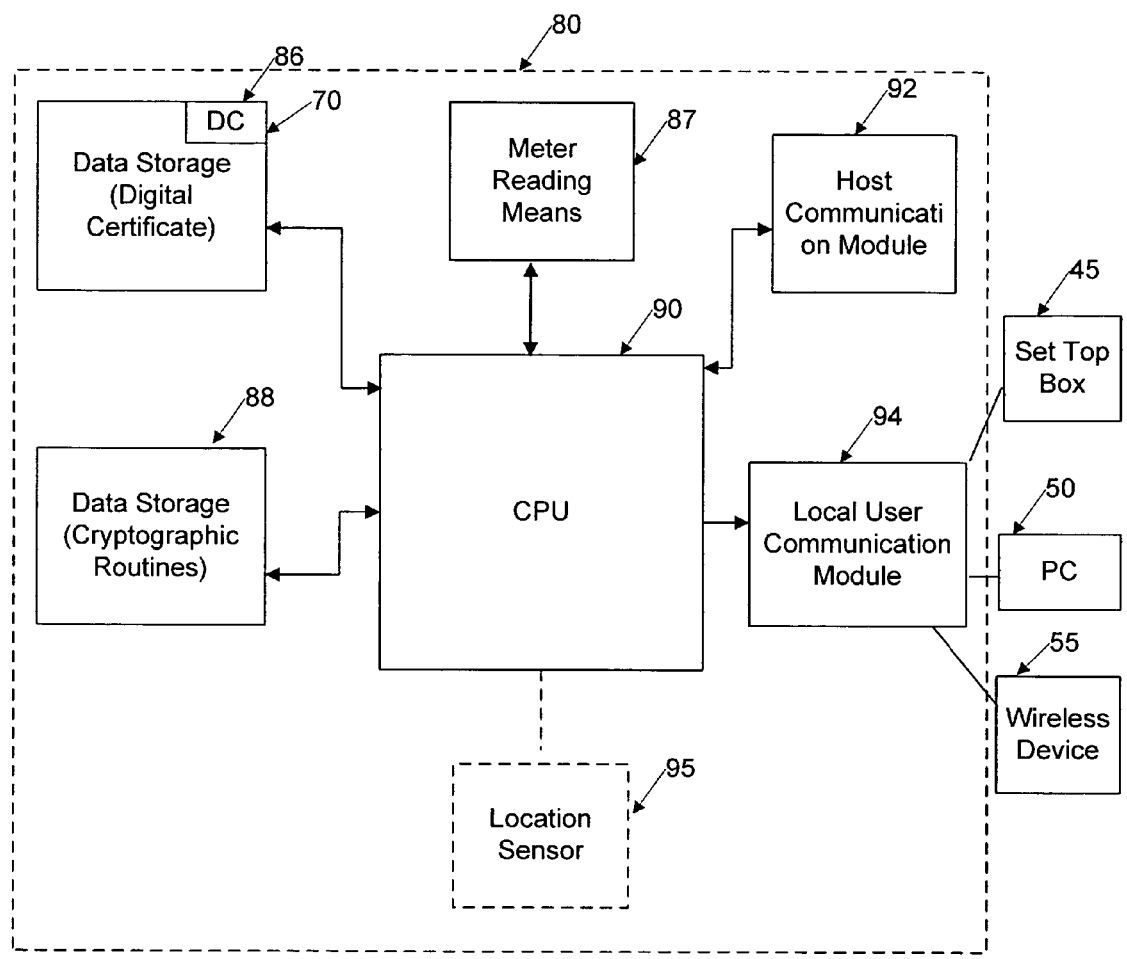
FIG. 11 is a block diagram of the home or building unit of the embodiment of FIG. 10.

FIGS. 10 and 11 illustrate an alternative embodiment of an authentication system and method in which an electric power company network is used as the basis for the authentication system instead of telephone company or other service provider networks of the previous embodiments. The traditional way to keep track of client power consumption is to attach a secure electric meter box to each home or other building, and to read the meter at periodic intervals for billing purposes. However, electric power companies around the world plan to use network technologies to eliminate the need for their own personnel to have to visit each building periodically in order to read a meter. The same system would work with a water or gas company using a metering system which transmits periodic meter readings via a company network.

The system of FIG. 10 assumes that a utility company, such as an electric power company, has an established network of reader/transmitter devices that are primarily intended to query each structure 40 for the state of its electric meter for a given time period. In this case, a secure component or home unit 80 comprises a meter box or housing containing components or circuitry of the local authentication control unit. The home unit 80 is securely attached either inside or outside the building or physical structure 40. The control unit is illustrated in more detail in FIG. 9 and is configured to control local operations of the authentication system as well as metering operations for the utility company. The control unit communicates with the host or utility network server 84 via virtual private network (VPN) 85. Other authentication control units in the vicinity can also be able to communicate with the host network server via network 85. The host server 84 in turn communicates with a trusted certificate authority or authentication server 20 for carrying out the authentication, or this function may be carried out by the host server 84 itself in alternative embodiments.

As illustrated in FIG. 11, the secure control unit within box 80 comprises a long-term memory or data storage module 86 sufficient to hold a digital certificate 70, extra long-term memory or data storage module 88 for holding cryptographic routines and the like, and a central processor 90 linked to the data storage modules 86 and 88. Both data storage functions may be contained in a single module in alternative embodiments. A meter reading module 87 is also linked to the central processor 90. The control unit further comprises a host communication module 92 for communication with an access point of network 85 via a dedicated wireless or fixed wire link, and a connection or local user communication module or router 94 for connection with consumer devices within the building using wireless or fixed wire links.

Although the home or building unit is associated with a specific, unique physical location or address by the host network server 84 on installation, further security may be provided by including a location sensor module 95 such as a global positioning system (GPS) sensor module or other type of location sensor in the control unit. The location sensor may be used to verify the geographic location of the box 80. If the box were detached or removed from the building, the geographic coordinates would no longer match the building location associated with the digital certificate, providing an immediate indication of tampering with the system. This can ensure that the control unit cannot be moved from its fixed building location and taken to another location for illegal activities using an established digital certificate 70 stored in data storage module 86. In this case, input from the location sensor 95 is checked and compared with the location of the building to which box 80 is supposed to be attached, in order to authenticate the digital certificate 70 each time a secure communication or activity is requested by a client or user. In the embodiment of FIGS. 10 and 11, the counterpart keys for the digital certificate may be stored in data storage module 88.

Suitable software is provided in the data storage modules 86,88 and/or processor module 90 for operating the user or client end of the authentication system. The physical structure or enclosure for the home or building control unit is designed so that it cannot be easily moved, and can have an identification code or the like showing ownership by a person or corporation that can be identified. Other security measures may also be taken, for example so that the digital certificate is canceled on detection of someone breaking into or moving the box 80.

As in the previous embodiments, the host or utility network server 84 is linked to the trusted certificate authority or service operator data base/authentication server 20 which collects the data from all of the physical structures 40 subscribing to the authentication service and provides digital certificates 70 to verified structures, and also makes this information readily available for fast and efficient queries over the Internet 65 (or other public networks). As indicated in FIG. 10, user devices within physical structure 40 are linked with the Internet or other public network 65 by wire or wireless connections, as is the trusted certificate authority or authentication server 20. As in the previous embodiment, the trusted certificate authority server and data base may be provided by the utility company itself as part of its own network server and data base 84, or may be a completely separate entity as illustrated in FIG. 5.

The home or building unit or secure component 80 in FIG. 10 is connected to various user devices within the building 40 by a router or the like, which may be built into the control unit in box 80. Such a connection may be (but is not limited to) Internet Protocol (IP) over Ethernet. The software and communication modules are designed to support secure two-way communications between the structure 40 and the host server 84, such as the power company, and between the structure and consumer or user devices in the structure, such as the devices 45, 50 and 55 and other electronic devices in the structure. In the embodiment of FIG. 10, additional security elements such as dongle 95 may be installed in the home unit 80 and in the user devices connected to the home unit, as in the embodiment of FIG. 9.

Periodically, each building control unit can report meter data along with information that confirms the state of the digital certificate 70 to the host server or operations center 84. The digital certificate status information is transmitted to the authentication server 20 (if separate from the host server) by way of one or more intermediate data gathering points or network relay stations. Upon receiving the status information, the authentication server can update a data base that is intended to verify that the certificate is authentic and has not been tampered with, so that it can be used to verify network transactions for people residing or working within the building 40. Periodic digital certificate status updates are sent from the edge site servers to the host server and then to the authentication server.

Since a network deployed by a power company may only report to the operations center on a periodic basis, it is important that a large, secure, high capacity server be deployed that can use the information gained by authenticating digital certificates so that instantaneous network requests can be made to authenticate secure network activities based on such certificates.

Once the authentication network has been set up, it can be used for authentication of set top boxes 45 using pay television services, verification of no spam emails for user devices having email capability, authentication for Internet e-commerce transactions, reduction of identity theft, and reduction of other types of network-based fraudulent activities.

In the past, a number of significant efforts were introduced to authenticate network users at the chip level. These efforts were not implemented, largely due to the vocal concerns about the protection of personal privacy. This was due to the fact that authentication devices were being imposed on people against their will, hidden within the client devices. In contrast, the authentication system and method of this invention is not installed unless specifically requested by the client or user, and can easily be turned ON or OFF by the client at will. Of course, when the system is not activated, the client can not be able to do business with other network services or users requiring this level of authentication for secure transactions over the Internet or other public network.

Additionally, the client only needs to be able to send the public key, which may be associated with the digital certificate assigned to the client's building in the embodiments of FIGS. 5 to 11, or a connection line identifier in the embodiment of FIGS. 1 to 4, to a prospective network partner in order to be authenticated. No personal information such as addresses, phone numbers, or other specific information about the building is required. A query from the prospective network partner to the authentication server can return a YES if there is an adequate basis for trust, and a NO if there is no basis for trust.

If people using the authentication system engage in illegal activities, then the appropriate authorities can have the ability to obtain information on the physical address of the building as well as building owner/user information from the data stored at the authentication service headquarters, and can take appropriate action. This is no different from using current state of the art forensic means to locate and verify illegal activities taking place over the web.

With this system, only the home or building needs to authenticate itself with the remote authentication service or data center. The user devices within the home are authenticated to customer premises equipment such as a single building gateway, secure gateway module, router, modem or switch (FIGS. 1 to 9), or a combined meter and security control unit 80 as in FIGS. 10 and 11. Just as utility companies today offer their services to individual renters within a residential environment or to individual users within an office or business environment, the authentication service of this invention can provide an equal level of granularity. The owner of a building does not have to take responsibility for the entire structure, but can require individual renters to take responsibility for their area via digital certificates assigned to each renter. This can be achieved easily by creating a hierarchy and issuing individual digital certificates and keys to each user or renter.

Figure 12:
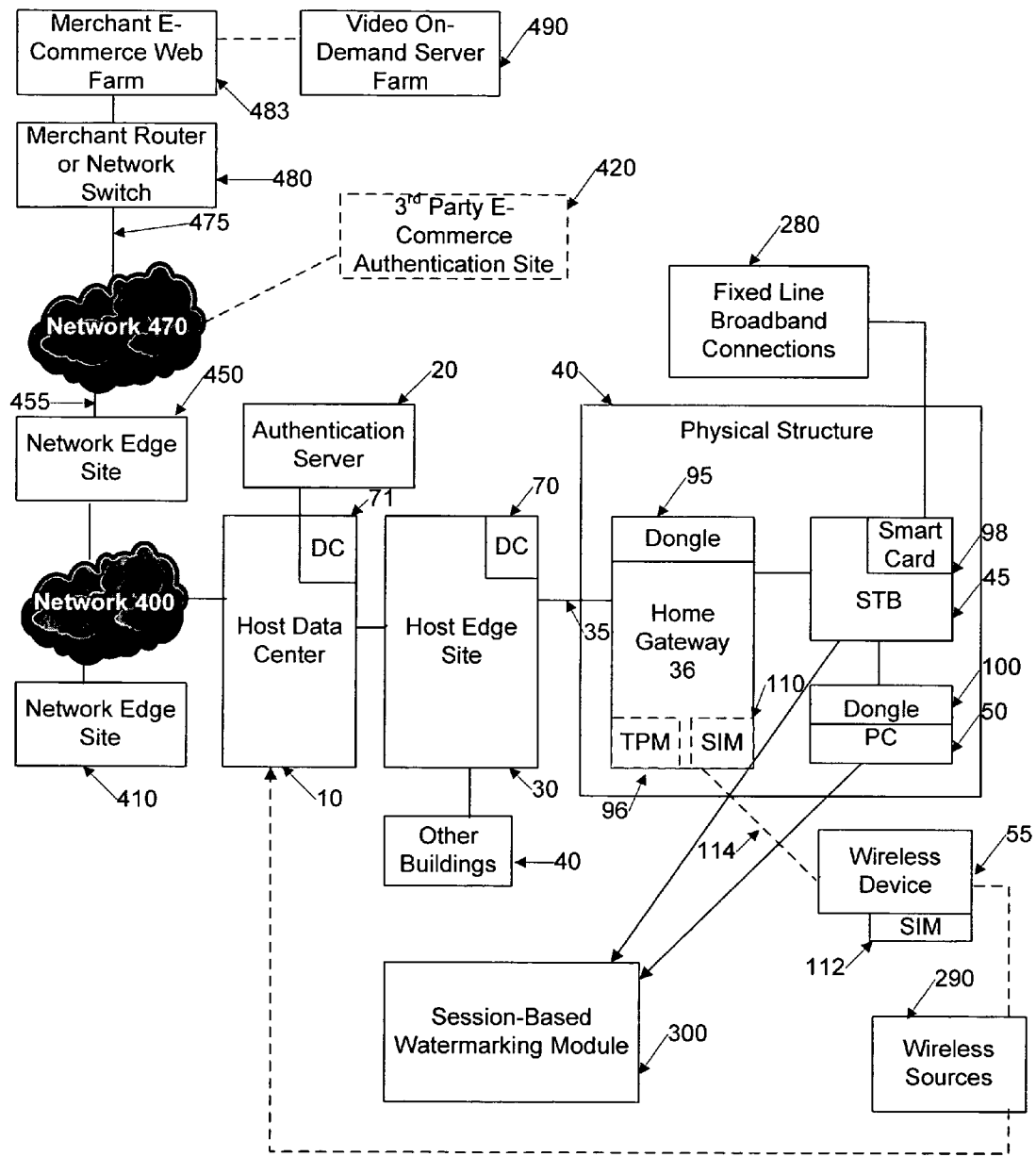
FIG. 12 is a block diagram illustrating a modified authentication system similar to FIG. 9 but providing for two way authentication.
Figure 13:
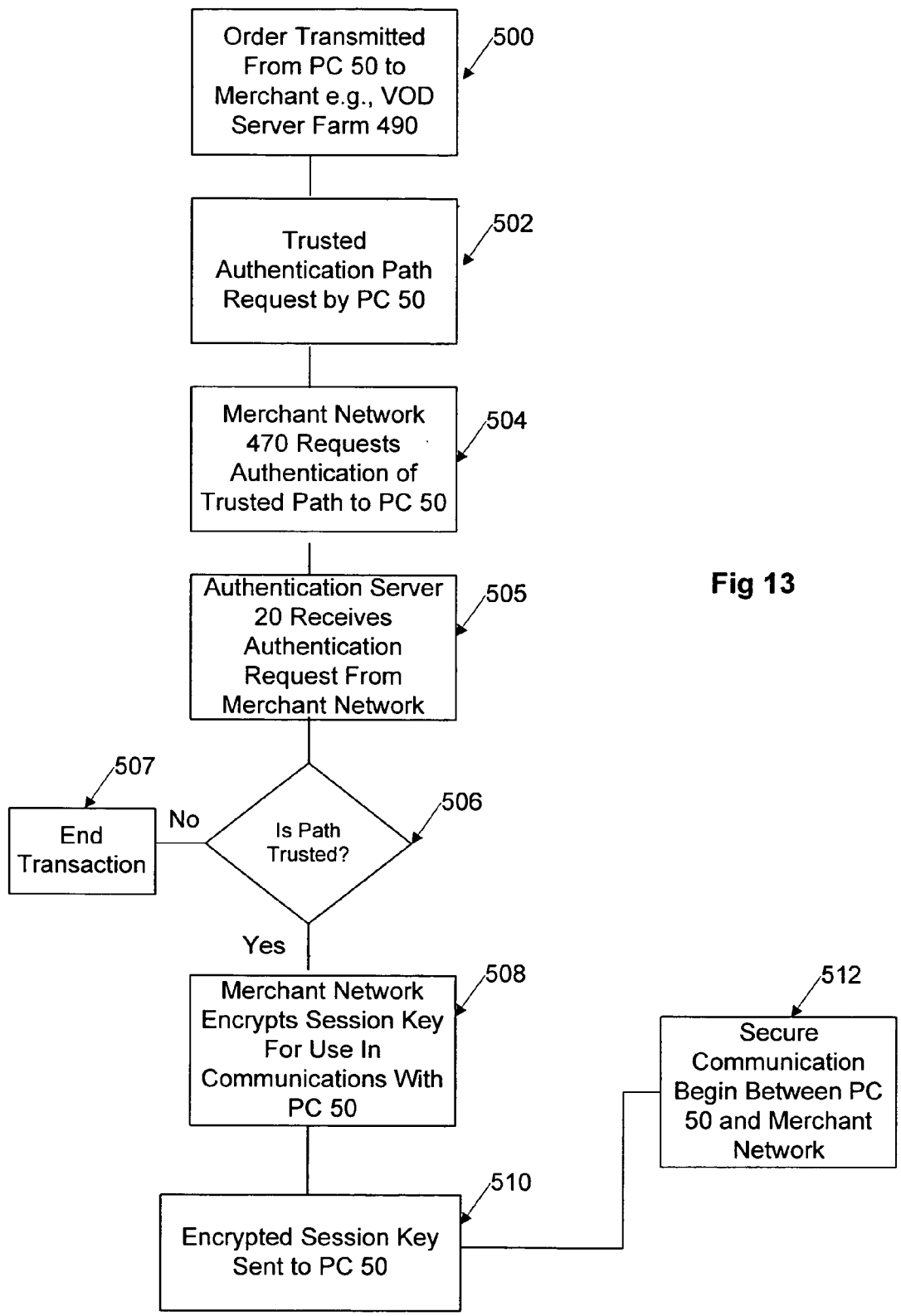
FIG. 13 is a flow diagram illustrating an authentication method according to an embodiment of the invention.

FIG. 12 is a more detailed illustration of the authentication system of FIG. 9 showing the system linked to merchant web farms or service providers, and FIG. 13 is a flow diagram illustrating the authentication procedure when a registered subscriber orders a service from a merchant over the pathway indicated in FIG. 12. Although this embodiment uses actual digital certificates 70 to identify a unique wired or wireless connection 35 to a building 40, the security certificate may instead be established in the manner described above in connection with FIGS. 1 to 4, i.e., by identifying the physical connection ID as implemented in a computer data structure or database record and using this physical connection ID as the "certificate" for authenticating a subscriber communicating via that connection ID.

The digital certificate 70 for the home or building, when used, can be a single digital certificate or can be distributed between the physical structure 40 and the telephone company or host edge site 30, and can be stand alone or combined with network elements in the physical structure to provide a chain of certificates, as described above in connection with FIG. 6. When a digital certificate is distributed between physical structure 40 and edge site 30, bonding can occur based on the physical connection between structure 40 and edge site 30, or via a cryptographically secure connection established between the edge site 30 and physical structure 40. For the purpose of the following description, it should be understood that the term "digital certificate" may be an actual installed digital certificate such as an X.509 certificate, or may be an association made between the communication line connecting a home or building to a network edge site, or a port for receiving communications via such a line, as described above in connection with FIGS. 1 to 4.

Communication line 35 between edge site 30 and the building gateway, router, modem or switch 36 may be wired or wireless, as described above in connection with the previous embodiments. When wireless communications are used, the communication line 35 can be established using a combination of a wireless connection and some client device specific information, such as a serial number, SIM card, smart card, secure memory in the client device, network MAC address, or any other identifier that is used to establish the wireless device (cell phone, wireless modem, or other wireless device) for a service provider or the like.

FIG. 12 illustrates a communication path from a user device associated with a physical structure and a merchant or service provider. The host data or operating center 10 and edge site 30 are linked to a network 400, which may be any type of physical or wireless network, such as the Internet. Various network edge sites 410 similar to edge site 30 are linked to network 400 in the usual manner, including edge site 450 of merchant network 470. Merchant network 470 is a computer network for a merchant or business location. Examples include the EBAY® computer network that can be described as a distributed collection of computer devices that provide the processing for www.ebay.com. Another example would be the distributed computer processing for an e-commerce business site or educational site. A merchant e-commerce web farm or data center 483 is linked to the merchant network 470 via merchant router or network switch 480. A merchant e-commerce web farm is a cluster of computers that perform processing for a merchant's business or service process, such as an e-commerce site. One specific type of e-commerce web farm which may be linked to network 470 is a video on-demand server farm 490, which is a cluster of computers which provides video delivery services to subscriber devices such as STBs, Smart Cards, PCs, Carrier Based Wireless Devices and the like via home gateway module 36. Video On Demand (VOD) Server Farm 490 can distribute other forms of content and media and is not limited to video content. Video On Demand Server Farm also represents any type of e-commerce, educational, sports, customer registration or other Internet site.

In this embodiment, authenticated or trusted communication paths between users or subscribers and service providers may be established using security credentials embedded in key network components. A credential can be an identifier or digital certificate physically contained in a device, or an associated credential provided by a third party such as a Telco. The credential may be an x.509 digital certificate, as in the embodiments of FIGS. 5 to 11, or may be a security credential identifying one particular physical connection from a Telco edge site 30 to physical structure 40, as described above in connection with FIGS. 1 to 4. The credentials for key network components are used to authenticate that a certain network end-point (client or server), or messages between two end points are from known networks and known network locations that are authenticated based on their physical network connections (communication line 305 or 35) using any of the techniques described above in connection with FIGS. 1 to 11. Verified credentials in a trusted communications path can be as little as validating a single communications line 35 to a physical structure 40 or as much as validating multiple end points in the communication path, e.g., from PC 50 to merchant network 470. Credentials can be verified by accessing a Telco or other host data center 10 to verify the security credential for physical structure 40, or verification may be carried out by an independent 3rd party e-commerce authentication site 420 or by a trusted certificate authority or authentication server 20 that verifies the building security credential.

Additional elements of a trusted path can be added to the authentication process, including certification of any network edge sites in the path (for example elements 450 and 30 in FIG. 12) that physically connect network points such as a client device (STB 45) and a merchant network 470. Trusted path communications can include numerous major elements in a communications network including Internet Service Providers (ISPs), Network Access Points, Fiber Backbones, high-speed global internet communications circuits, transoceanic communications, satellite and microwave communications circuits or paths, and the like.

In one embodiment, two communications path authentications may be performed to establish a trusted path between two network devices. The term "trusted path" as used herein means that one or both of the network devices involved in a transaction is at a known location such as connected to a physical copper wire pair. In the case of physical structure 40, the known location is communications line 305 or 35. For the merchant network 170, the known location is the physical line 455 connecting the network edge site 450 to the merchant network, which may be a dedicated phone connection such as a T1 line, for example. The associated security credential of the physical connection to a device is used as part of a subscriber check and a subscriber is deemed as authentic if the subscriber's associated Digital Certificate or physical connection ID for physical structure 40 matches the expected association. The expected association of physical structure 40 to the digital certificate for the structure 40 can be established when the subscriber registers for service or when the subscriber name and/or address is used during registration or e-commerce transaction. Edge (perimeter) devices such as edge sites 30 and 450 can be authenticated, providing for known on-ramp connection of client to Telco and off-ramp connection from Network Edge Site 450 to Merchant Network 470. In addition to authentication of the subscriber physical communication line 35 authentication and connection to Telco Edge Site 30 and merchant connection (Network Edge Site 450 to Merchant Network 470), the client can be further authenticated using dongle (100) attached to PC 50, or smart card 98 attached to STB 45 or TPM 96 in Home Gateway 36, security dongle 95 connected to home gateway 36 or other additional security credential.

Additional authentication of network devices beyond the edge devices 30, 450 may also be provided in order to enhance authentication strength of authentication network. Examples would include authentication of the Telco or host data center 10 (when the host or Telco edge site communicates through Telco data center), and other network transmission and communications equipment (shown as network 400).

Wireless devices 55 can be authenticated to provide a trusted communication path by authenticating the SIM card 112 in the wireless device via wireless sources 290, or by authenticating a transmission path to wireless source 290. To establish trusted path communications between wireless device 55 and merchant network 470, the wireless sources 290 may authenticate the wireless device 18 using SIM card 112 if present, or by means of other authentication methods used by wireless sources or service providers 290. When carrier based wireless device 55 is authenticating a merchant network 470, the wireless device may use a Digital Certificate of merchant network 470, and can optionally include authentication of network edge site 450 connections to merchant network 470 when the client is authenticating merchant network 470.

FIG. 12 shows a simplified block diagram element or module 290 for wireless carriers or service providers, but the internal details of wireless sources 290 can include all network and communications equipment typically used in carrier based and non-carrier based communications networks. Trusted path communications can include authentication performed by a single node in the wireless sources or carrier network 290 or by multiple nodes. Additionally, carrier based wireless device 55 can be authenticated solely via wireless device 55, or via wireless source 290, or via a combination of both wireless device 55 and wireless source 290, or even by a combination of both and a third part authentication agent (separate agent, certificate authority (CA), or other).

Trusted path communications can also be achieved with wireless device 55 when no SIM card is present in the wireless device 55. Wireless sources 290 can perform the standard Subscriber Authentication normally used by a wireless service provider to authenticate a wireless device 55, and the wireless source or service provider 290 can provide an interface to the external world that can be used to check the status or identification of carrier based wireless device 55. Wireless source 290 can add a message indicating that the wireless device 55 has been authenticated and can provide information about whether wireless device 55 has been reported stolen or compromised. Once wireless device 55 is authenticated by wireless source 290, the wireless source 290 can provide wireless device authentication results to a trusted certificate authority, authentication server 20, merchant e-commerce web farm 483, or other service provider or equivalent performing client authentication or providing details on client authentication.

For wireless devices 55 that do not include a SIM card or equivalent security element, wireless sources 290 can indicate lack of SIM card to an authentication server, CA authority, and other agents or computers involved in the authentication of wireless device 55. Indication of wireless device security element (SIM, other security element, or none) can be used to indicate strength of client authentication by a trusted CA, authentication server, or equivalent agent and this information is provided to merchant network 470 when merchant network 470 is authenticating wireless device 55.

In one embodiment, the client device (STB, PC, or Wireless Device) is set up to authenticate the connection to a merchant network 470 by authenticating the physical line 455 in a similar manner to line 35, in addition to using typical e-commerce credentials for such merchants. Information can be obtained by the client from a trusted CA, authentication server or service, agent or merchant network service provider (not shown) that allows the client device to verify that a network path between the client device and merchant network is established over the correct physical line (line 455 in this example). Such trust is established by Trusted CA or authentication server 20, the host network 10 providing service to merchant network 470, or a third party agent or authentication service 420 authenticating physical line 455 or providing credentials on physical line 455 that can be verified by client devices.

In the following description, the term "home-based authenticated device" describes a computer-based device such as a personal computer (e.g., PC 50), other computer, Personal Digital Assistant or PDA (not shown), Set Top Box (e.g., STB 45), a digital video recorder (DVR) (not shown) or other consumer type product (television, radio, video player, projector) in the house or building network that has an association via the physical connection from the network edge device to the home or apartment or business, with the association to the physical connection used to authenticate the device. In this case, the term "home" means any physical structure or building where people live or work.

Home-based authenticated device can also include home network infrastructure items such as a home gateway module 36, as well as a home gateway module with security dongle 95, SIM card 110, and/or TPM 96. The term home gateway or home gateway module as used in this application can also apply to any home networking device such as network router, network switch, DSL modem, cable modem, fiber to the home (FTTH) network equipment, dialup modem, fiber to the curb (FTTC)/FTTC equipment, satellite receiver, other modem or network communications equipment. The physical association may be via a physical connection to a device or via the association of a wireless authentication provided by a wireless service provider.

For enhanced security on high-value transactions, users may be required to provide additional information such as a password, PIN or security code via the keypad or keyboard of client device connecting over a trusted or authenticated communications path.

In one embodiment, the authentication system is configured so that a network device can automatically detect that an authenticated transaction is requested and the transmission path of the authenticated transaction can also be authenticated. This can be achieved by adding a suitable extension to existing protocols, developing and specifying a new protocol, performing a separate message transaction, providing a secure interface at any network point that can be interrogated, adding additional message encapsulation with added security information added to messages flowing from client to server, and determining the network path between an authenticating device (merchant network 470) that is checking the physical connection from communications line 35 to client device in physical structure 40 such as STB 45.

In one embodiment, physical connection authentication is performed during the initial communications establishment between the two end-points. The two end-points may be STB 45 and Merchant e-commerce web farm 483, for example, or may be any user device and network service provider. After authentication of the physical connection, the two end-points can then use symmetrical encryption between the end-points. This means that a secure, authenticated communications path is verified before a session key pair is generated between the two end-points. Performing authentication only during initial setup provides a trusted, known communications path before session key exchange between the two end-points, even when two-end points are in an open Internet. Another embodiment of this invention does not use a session key for message communications between two-end points, rather the two end-points can use PKI based asymmetrical encryption using the authenticated private/public key pairs of each network endpoint.

Another optional method is that a trigger or identifier is added to indicate a trusted path authentication session is requested and automatically handled by network equipment such as network routers, switches, DSLAM, Broadband Loop Carriers BLC, wireless cell sites, wireless routers, wireless switches, DOCSIS network equipment, network access equipment, and other edge and network infrastructure devices. The trigger indicates that the client, or server, or client and server, or additional network equipment should add network path authentication information to a transaction either through the use of a new protocol or the automatic encapsulation of a message being sent between two network end points. Automatic detection of a request for a trusted path authentication session can occur based on a request for any type of network device such as STB 45, Home Gateway 36, PC 50, Carrier Based Wireless device 55, VOD server Farm 490, or similar type computer or device at a consumer site or commercial site. Automatic detection can be based on an extension to existing network, Transmission Control Protocol/Internet Protocol (TCP/IP), Asynchronous Transfer Mode (ATM), dialup modem, DSL, DOCSIS, satellite communications protocol, or by defining a new authentication specific communications protocol. Automatic detection of authentication protocol when based on an existing protocol such as TCP/IP or Secure Socket Layer (SSL) can utilize an enhance message indicating that trusted path authentication is requested.

As has been noted above, the use of X.509 based digital certificates for the authentication is optional. The key element of the authentication is the association of a physical communication line 305 or 35 to a physical structure 40 containing one or more computer devices (STB 45, PC 50, Home Gateway 36, etc.), providing physical endpoint authentication information that is then provided to a remote server that can use the physical endpoint connection in verifying the network device. The association of the communications line 35 to a Physical Structure 40 and devices in Physical Structure 40 can be established with and without the use of X.509 certificates and even without the use of the X.509 standard (using non X.509 based certificates or using only a simple association data structure). Association of communications line 35 or other secure component and computer devices in physical structure 40 greatly enhances the authentication of a subscriber where there are no smart-cards, secure memory, cryptographic coprocessors, etc.

In one embodiment, the authentication system provides trusted path communications by associating a client to the physical connection to a home/subscriber without any security element being associated with the home or subscriber. This means that the physical connection information can be used to eliminate client device security elements or may be used in addition to such elements to enhance the authentication of client device security.

Referring to FIGS. 12 and 13 and using STB 45 with home gateway module 36, communication line 35 and Telco edge site 30, an authentication or trusted path may be established as follows, without relying on any security elements in the STB 45 and home gateway module 36. STB 45 connects to a home gateway module 36 using any wired or wireless communications techniques and begins a connection with an application server at the location referred to as Merchant e-commerce web farm 483 connected to Merchant Network 470. When STB 45 connects to home gateway module 36, home gateway module 36 performs IP address translation such as that provided by NAT (Network Address Translation) whereby the IP address for the STB 45 is different than the IP address provided to the Telco network by home gateway module 36. STB 45 connects to Merchant Web Farm 483, providing one or more insecure ID(s) such as STB serial number, or MAC address, or User ID with or without a password. Upon receiving the connect message for a service that requires authentication, Merchant Web Farm 483 can identify the physical communications line 35 connecting Telco Edge Site 30 to physical structure 40, home gateway module 36, and STB or user device 45. Merchant Web Farm can identify the communication line 35 that connects Telco edge site 30 to home gateway module 36 for a subscriber STB 45 via a trace route mapping or other connection identification method, as described in more detail below (IP address lookup, etc.).

Telco or host edge site 30 can provide a mapping lookup function that can map an IP address or a NAT translated address to a permanent identifier for the communications line 35 without revealing the identity of physical structure 40. Such an identification can use a post Telco Data Center NAT address translated IP address for communications line 35 that remains permanent for physical structure 40, but may be temporary with regards to the actual IP address because of DHCP or equivalent running on the Telco Data Center 10 or the Telco Edge Site 30. This permanent association allows a Merchant Web Farm 483 to associate physical line 35 to a subscriber when the subscriber registers with the Merchant Web Farm 483 for services offered by the merchant. One possible association model is provided in Table 1 below:

TABLE 1

Subscriber Association Model

| Entity | Identify | Association | Action |
|---|---|---|---|
| STB | Basic identifier such as non-secure serial number or User ID | User ID for a subscriber or STB | User ID or equivalent is provided as part of a non-secure login |
| Communications Line ID - DSL | For DSL: DSLAM physical copper wire/port association. | The telco IP address port number presented to network 400 is associated with the Communications Line 35. | Telco provides association of communications line 35 and IP address port number presented to Network 400 for STB 45 or other user device in building 40. |
| Communications Line ID - Cable | For Cable: DOCSIS, DAVID, Cable Modem Termination Server (CMTS) or physical layer or higher network layer identifier that identifies a communication line 35 to a home. | The Cable companies IP address port number presented to Network 400 is associated with the communications line 35. | Cable company provides association of communications line 35 and IP address port number presented to network 400 for a connection between STB 45 or other user device in building 40. |
| Communications Line ID - Fiber | For fiber-to-the-curb (FTTC)/fiber-to-the home (FTTH) or different physical layer connections to Physical Structure 40, a physical layer or higher network layer identifier that identifies the Communication Line 35 to a home | The FTTC providers IP address port number presented to Network 400 is associated with the Communications Line 35. | Cable company provides association of Communications Line 35 and IP address port number presented to Network 400 for a connection between STB 45 or other user device in the building. |
| Telco Data Center (TDC) | Identity of TDC can be determined via Traceroute-like function or protocol encapsulation or other method | TDC provides method that associates the communication line as described in the above 3 rows of this table | Secure method is exposed by TDC or Telco Edge Site to provide communications line ID. Secure method for communications line ID can alternatively be provided by Trusted CA 1 or other trusted entity |

The authentication system and method of the above embodiments may be referred to as trusted path communications. In one embodiment, the authentication or trusted path communication method and a standard message used to indicate that trusted path authentication is requested can be added to any layer of the Open Systems Interconnection (OSI) seven layer network such as the Physical Layer, Data-Link Layer, Network Layer, Transport Layer, Session Layer or Presentation Layer. Network equipment enhanced with components and software to provide for automatic trusted path authentication can automatically detect the authentication request at the appropriate layer of the OSI seven layer network model. When other network layer models are used, the trusted path authentication can be added to any layer or multiple layers of the network model. A trigger added to an automatic authentication indicator of an existing protocol such as SSL can indicate to network equipment that additional authentication data needs to be added by encapsulating the non-authenticated network packet in a new packet header including an authentication data header or by sending an additional packet (not encapsulating the non authenticated network packet) with the enhanced authentication data (out-of-band message). Trusted path network equipment can detect that a trusted path communications session is requested and can automatically apply the appropriate trusted path security or authentication method, as discussed in more detail below.

There are many possible methods for establishing an authenticated or trusted path communication session, but the key to any applied method is that the trusted path network enhanced equipment performs some processing that results in the communications network equipment being identified as a verified authentic network path. One skilled in the art of computer network software or hardware design at a particular network layer can apply the techniques as described below to establish the authentication method and system. General techniques applicable at the various layers of the OSI 7 layer Network Model are outlined in Table 2 below. The hardware and software needed to establish trusted path communication or authenticated path communication can be completely added at a single model layer or distributed over more than one model layer. When more than one model example is given in the table below it is also envisioned that one skilled in the art can implement the specific function at only a single layer, for example adding the Trusted Path communications to only the Browser layer, or adding the Trusted Path communications to only the Hyper Text Transfer Protocol (HTTP) function of the Application Layer (layer 7).

TABLE 2

Possible authentication techniques which may be applied to different layers of OSI 7 layer network model to establish trusted path communications

| Layer | Example | Details |
|---|---|---|
| 7 Application | Application | Enhanced application software includes an authentication method to establish authentication with remote site. Enhanced application software can use an extended protocol that triggers network equipment (Telco Edge Site 30 in FIG. 12 for example) to encapsulate network message with authentication data or to send authentication data information in a separate message from the network message being sent. |
| | HTTP | HTTP protocol extension to perform authentication with remote. Can also be added to HTTP over SSL (HTTPS) protocol. HTTP protocol extension can add HTTP message information including authentication data. HTTP protocol extension can also be achieved by encapsulating HTTP request in HTTP request with trigger to have network equipment add authentication data. |
| | Trace route | Trace Route can be used to determine the network topology so that the edge device (Telco Edge Site 30) can be detected. Once Telco Edge Site 30 is detected on server side by performing a Trace Route type network mapping, the server side (Merchant Network 400 based computer) can perform a inquiry of Telco Edge Site 30 with return IP address of request (IP address of the requesting client STB 45 for example), or information to identify the IP address or information about the requesting client (STB 45 in this |

TABLE 2-continued

Possible authentication techniques which may be applied to different layers of OSI 7 layer network model to establish trusted path communications

| Layer | Example | Details |
|---|---|---|
| 6 Presentation | SSL | example) and obtain the identification for the Communication Line 35 connecting Telco Edge Site 30 to STB 45 in Physical Structure 40. Extensions to Trace Route or new applications can be added that can allow the Telco Edge Site 30 to be identified so that added authentication processing can be added to the new application or enhanced Trace Route. One example would be secure Ping whereby a secure ping operation is performed to "ping" the network components and obtain authentication data from network components. The Secure Ping is a ping-like message that uses the IP address of the client STB 45 making a request. The Secure Ping is intercepted by the Telco Edge Site 30 with a secure response to the Secure Ping being provided by Telco Edge Site 30. The Secure Response would be signed, allowing the Merchant Network 400 to verify the Secure Ping Response came from a known, trusted Telco Edge Site. Enhancement to SSL protocol to add authentication to any portion of the SSL protocol. An example includes the authentication portion of the SSL protocol where the server optionally authenticates the client and this client authentication can be enhanced by obtaining authentication of a client's Telco Edge Site 30 by a server authenticating the client, in this case Merchant Network 470, or by a client authenticating the server, or authentication of both client and server by each side. An authentication extension can be added to any one or more parts of the SSL protocol but the most likely way would be the authentication portion of the Open SSL protocol. Another way of adding secure authentication to the SSL protocol is to enhance client authentication by the remote server and add additional processing by the server to authenticate the physical connection to the client connecting to the server. Another example of how SSL layer authentication can be added is to have the authentication performed by a trusted Certificate Authority (CA) or authentication agent. A separate Authentication Agent may be added anywhere in the network to verify the association of a X.509 digital certificate (or equivalent) of a certificate owner (for example in STB 45, or Smart Card 98 associated with STB 45) via the Communications Line 35 which subscriber is communicating from, when X.509 digital certificates are used in a system. |
| 4 Transport | Transmission Control Protocol/ User Defined Protocol (TCP/UDP) | Enhancement to TCP connect to authenticate a client before the TCP connection is established. In this case, the Client ID can be established before the connection occurs or as part of the connection. Another method would be to encapsulate the TCP connection with certain websites including an encapsulated User Identifier that can be used for providing authentication. |
| 3 Internet | IP, Internet Control Message Protocol (ICMP), Address Resolution Protocol (ARP), | Enhancements to the Internet Layer protocol with protocol enhancements such as Internet Protocol Security (IPsec) whereby the enhancement provides authentication information in protocol encapsulation or enhancement. When authentication is added at the IP layer, protocol extensions or added encapsulations are provided to pass the information provided by the authentication at this layer to higher layers |

TABLE 2-continued

Possible authentication techniques which may be applied to different layers of OSI 7 layer network model to establish trusted path communications

| Layer | Example | Details |
|---|---|---|
| | RARP (reverse ARP) | in the protocol or providing the authentication information, to higher layers in the protocol or applications running on either the client or server or both. |
| 2 - Data Link | | Enhancements to the Data Link layer are not the preferred layer for adding authentication information. However, authentication information and status (such as the physical line used to connect to a subscriber) can be conveyed at the Data Link Layer through protocol encapsulation, protocol enhancement, or the generation of new protocols. When authentication information is added at the Data Link layer, protocol extensions or added encapsulations are provided to pass the authentication information at this layer to higher layers in the protocol or applications running on either the client or server or both. |
| 1 - Physical | | Adding authentication at the Physical Layer is not the preferred technique. However, authentication information and status (such as the physical line used to connect to a subscriber) can be conveyed at the Physical Layer through physical layer extensions or the generation of added messages at the physical layer conveying the authentication information. When authentication information is added at the Physical layer, protocol extensions or added encapsulations are provided to pass the authentication information at this layer to higher layers in the protocol or providing the authentication information to higher layers in the protocol or applications running on either the client or server or both. |

There are many different ways that a network protocol or application can be modified to support the authentication system and method as described herein. FIG. 13 illustrates one method of authenticating a path from a user device to a merchant or service provider, to provide a secure or trusted communication path. In step 500, an order is transmitted from a user device in a physical structure, such as PC 50 in FIG. 12, over one or more networks to a merchant, e.g., a VOD server farm 490 or any type of network service provider. In one possible example, the application layer interfaces to network software in PC 50 and requests trusted path authentication (step 502). It should be noted that, in this example, the application knows that authentication of the subscriber is needed to order a video. If the application software does not perform this step automatically, then the merchant network 470 can authenticate the client by using an authenticate client request command. The request for trusted path authentication does not have to come from the application layer. PC 50 does not even need to know that a trusted path authentication is being performed, and the server side only (merchant network 470) can request information to verify the trusted path. The network software receives the request for authentication of a communication path and starts the process for establishing a trusted path with the desired end point. In this case, the end point identifies the remote machine with which the user desires to connect, such as VOD server farm 490 or merchant e-commerce web farm 483.

The Telco or host edge site 30 receives a "trusted path establish connection" message from PC 50 via home gateway module 36 through communication line 35. In one embodiment, the edge site 30 may be configured to add node specific authentication to the trusted path establish connection message. Node specific authentication information can identify the physical line 35 to building 40, to produce a communication line ID for use in authenticating the user (rather than using a digital certificate). Alternatively, the edge site 30 can provide an application program interface (API) or web service that can be used to verify physical connections.

The Telco or host edge site 30 can also receive a request to authenticate a trusted path via a message from the server/web farm end point with which the PC 50 is communicating. In this alternative, the merchant network 470 can send a client ID to the edge site 30 or equivalent, so that the edge site can identify the subscriber which the merchant network 470 wishes to authenticate. The merchant website can also request authentication information from the host or Telco that would allow a trusted or authenticated path to be established.

In one embodiment, the merchant network edge site 450 receives a trusted path establish communication or message from the Telco edge site 30, including node specific authentication information. The network edge site 450 adds network edge site node specific authentication information to the message. Multiple node specific authentications can be applied to the trusted path establish connection message in this way.

The merchant network 470 then receives the trusted path establish connection message with the node specific information of the edge sites and can then request validation of the trusted communication path by a trusted certification authority or authentication server 20, or a third party authentication service 420 (step 504). The merchant network or website requests the trusted CA to authenticate trusted path information provided by the Telco when the user device, such as STB 45 or PC 50, connects to the merchant network 470. The authenticate trusted path message can be digitally signed, for example with an encrypted time stamp, message sequence number, and optional random number, allowing the merchant network 470 to uniquely identify the message from the Telco or trusted CA.

The certificate authority (CA) or other authentication or security service receives the "authenticate trusted path" request from the merchant network 470 (step 505), and determines whether or not the path is trusted (step 506). The message from the CA is encrypted or signed with a private key of the CA, along with a message sequence number and timestamp to eliminate replay attacks. Although a certificate authority or separate or third party authentication server is referred to in this step, the software and hardware needed for authentication of the trusted path may instead be provided at the Telco data center 10, and the Telco data center in that case can provide a response to the merchant network 470 indicating whether or not the path can be trusted. If the path is not trusted, the merchant may choose to end the transaction (step 507).

If the merchant network receives a positive response to the authenticate trusted path request from the CA or similar authentication server, the message is validated using the public key of the CA, and the merchant network can also validate the time stamp, message sequence number, and random number added by the merchant network when the path authentication request was first made to the CA. The merchant network 470 can also encrypt a session key for use in communication with PC 50 (step 508), using the public key of PC 50. The merchant sends the encrypted session key to PC 50 (step 510). The public key of the PC 50, home gateway dongle 95, TPM 96, or SIM 110 can be used to encrypt the session key when sending to the PC 50. An optional method is to encrypt the session key for delivery to the Telco edge site 30 after encrypting with dongle key 100 of PC 50, and then to additionally encrypt the encrypted session key with the public key of the Telco edge site 30. The Telco edge site 30 can then decrypt the encrypted payload consisting of an encrypted session key. FIG. 14 illustrates the encrypted session key of this example, and is explained in more detail below.

The network edge site 450 receives the encrypted session key from the merchant network 470 while it is on route to the PC 50, and may optionally add node specific authentication to the encrypted session key response as part of the establishment of the trusted path connection sequence. The encrypted session key with the added node specific authentication may then be sent to PC 50 via network 400. The optional node specific authentication allows the PC 50 to verify the merchant network 470. The network edge site 450 cannot decrypt the encrypted session key.

The encrypted session key response from the merchant network 470 (step 510) is received at the Telco DSL edge site 30 or via a combination of the Telco data center 10 and edge site 30. Optionally, either the Telco data center 10 or the Telco edge site 30 can authenticate the merchant response. The encrypted session key is then sent to the PC 50 via communication line 35 and home gateway module 36 (if present). The PC 50 receives the encrypted session key and can optionally authenticate the communication path from the merchant web farm or VOD server farm 490. Secure communications can then begin between the merchant network 470 and the PC 50 (step 512).

The trusted communication path method described above allows for multiple encryption layers to be applied to the authentication or transport data stream, or both, as illustrated in FIG. 14. For example, PC 50 can encrypt a message for Merchant Network 470 and the Telco Edge Site 30 can add additional encryption layer for network edge site 450. Network trust can be achieved by having network edge devices such as DSL/DSLAM edge device 30 add encryption specific for a particular network edge site 450. Any network infrastructure devices can add such network path encryption. For example, assume Telco edge site 30 is connected to Telco Data Center 10 and Telco Data Center 10 is a large telephone company or other large service provider. Merchant Network 470 can enhance physical security by layered encryption of messages for a subscriber using PC 50. As illustrated in FIG. 14, a Telco Data Center Encrypted Message 550 may contain an encrypted message 552 for the Telco edge site 30, and message 552 in turn may contain an encrypted message 554 destined for subscriber PC 50. Alternatively, two layers of encryption may be provided instead of three, by placing encrypted messages for subscriber PC 50 in an encrypted message to the Telco Data Center 10. The two or three layers of encryption make the response useful to only a subscriber of the Telco. Enhancement of physical security by adding encryption specific for trusted or authenticated network paths can include one, two, or more physical network connections such as PC 50, Home Gateway 36, Telco Edge Site 30, and Telco Data Center 10. Each added encryption specific Trusted Network Path can include an identifier that can be used by the Trusted Network Path equipment to automatically remove the added layer of encryption.

Trusted path enabled communications devices can authenticate any desired authenticated (digitally signed or other cryptographic technique) points in the transmission path. For example, merchant network 470 can authenticate physical connections to PC 50 or PC 50 and dongle 100 if used, to Telco Edge Site 30, to Telco Data Center 10, and to network edge site 450, if desired. Alternatively, as little as one side of a network transaction, such as only PC 50, can be authenticated. Another example is where merchant network 470 authenticates PC 50 via dongle 100, home gateway 36 via dongle 95 or TPM 96, Telco edge site 30 via digital certificate 70, Telco Data Center 10 via Telco Digital Certificate 71 or network edge site 450 via certificate or secure credentials in network edge site 450 (not illustrated). The power of this authentication system is that as little as the PC 50 end point can be authenticated, or the PC 50 end point and any other desired elements along the path can be authenticated. Also, because the physical communications line 35 going to a physical structure 40 can be authenticated, the digital certificate 70 for physical structure 40 can be used in addition to, or in place of PC 50. This allows authentication of physical structure 40 using one or more authentication points.

Referring to FIG. 14, a message originating from Merchant Network 470 may start out as only the Encrypted Message 554 for PC 50, that can only be decrypted by PC 50. The encrypted message 550 for a network point (e.g., Telco Data Center 10) can include a Message Decryption Destination Point Indicator that indicates which network element along the trusted path should decrypt the message, such as Telco Data Center 10, Telco Edge Site 30, PC 50, or Home Gateway 36. As such, added security can be layered on top of end-point specific encryption allowing the trusted path network to identify messages that can be decrypted by the network device as the messages move through the network.

In FIG. 14, Telco Data Center 10 can identify that the message 550 can be decrypted by Telco Data Center 10. After decryption of the first encrypted message, the remaining message 552 consisting of the two inner boxes is forwarded to Telco Edge Site 30. The merchant network 470 may also decrypt or remove added message encapsulation data, not only network equipment external to the merchant network. The added encryption layering can be performed by the source point such as merchant network 470 or added by a network edge site such as network edge site 450 as shown in FIG. 12. Message encryption layers added to the basic end-point targeted message 554 can be based on an envelope encapsulating the message containing a envelope session key that is encrypted with the Public Key of the network element (such as Telco Data Center 10). The network element that needs to decrypt the message can decrypt the envelope session key using the Private Key of the network element to expose the session key. The session key can then be used to decrypt the session key encrypted envelope data that is an encapsulation of the basic end-point targeted message (Encrypted Message 554 for PC 50) in FIG. 14. The basic end-point targeted message is the message that is sent to the end-point with all other layers of encryption removed by network equipment along the trusted path, as identified by the Message Decryption Destination Point Indicator in the message envelopes.

Trusted Path authentication can operate as a completely secure SSL (Secure Socket Layer) transmission path with the authentication and transport encryption using asymmetrical key PKI based encryption with the PKI keys based on the connection end points (example STB 50 and VOD Server 490). End-point authentication (e.g., STB 50 and VOD Server 490) can be performed using asymmetrical key PKI methods and the VOD stream or other transport payload in the encrypted message can utilize symmetrical key encryption with a session key established between the end-points (e.g., STB 50 and VOD Server 490). Keys for symmetrical key encryption can be delivered after authenticating the transmission path. Keys for symmetrical key encryption can be exchanged between the end-points (in this case 50 and 490) using PKI keys for each end-point or using a session key established between end-points 50 and 490 after authentication. Alternatively, symmetrical encryption keys can use implied authentication by encrypting the session key using the Public key of the other end-point. Public Key of end-points can be obtained by a trusted CA or other certificate authority (not shown) that may be contained in system. In the above example, the STB 50 and VOD Server 490 were used as end-points, however any two network elements could serve as end-points. An example of trusted path authentication would allow Telco Data Center 10 to authenticate Telco Edge Site 30, Digital Certificate 70, Home Gateway 36 and PC 50.

The network user or client authentication method and system as described above can be added to any network infrastructure element including modems, FTTC, FTTH, or fiber to the neighborhood (FTTN) interface cards, cable modems, DSL modems, routers and network switches. The method and system includes automatic means for starting an authenticated transaction, and may also include transaction path signing by the Network edge device, transaction path signing by the application provider, transaction path verification by the client application, and transaction path verification by the service provider. For example, an on-line merchant can verify the following path:

1. Subscriber to Subscriber's ISP providing Internet service via physical line identification signing on the edge site linked to the subscriber.
2. Subscriber's ISP to ISP providing service to On-Line Merchant.
3. On-Line Merchant ISP to On-Line Merchant authentication via authentication at the ISP's network edge site containing the line or network edge device that connects the On-Line Merchant to the On-Line Merchant ISP.
4. On-Line Merchant's Business Gate (or computer) that connects the computers at the On-Line Merchant's site to On-Line Merchant ISP.
5. Optional, additional authentication of a network path within an On-Line Merchant This method provides a trusted VPN for the transmission path for authentication and registration. Registration may need to occur through the home gateway, meaning that the home gateway's certificate is involved in the registration of new user or client devices such as a TV, video phone, computer or the like. Authentication may begin with the home gateway when provisioned on a DSL or a secure physical line is used in the registration/authentication hierarchy.

In situations where the requesting client (STB 45 in FIG. 12, for example) does not start a session by requesting authentication when connecting to a remote server or e-commerce site, the remote server (Merchant Network 470) can initiate client authentication by making a client authentication request command. This command can interrogate the network equipment between the client (STB 45 and Telco Edge Site 30 or Telco Data Center 10 or equivalent) to obtain authentication data for the client.

In one embodiment, wireless devices such as device 55 of FIG. 12 may be linked through a carrier and the carrier's authentication of the wireless device. This may provide a good model for digital rights management DRM exchange whereby the wireless device is authenticated by the carrier and the home gateway or video distribution service can validate the wireless device is part of the person's private network.

Subnetwork authentication may be provided for High Bandwidth Digital Content Protection (HDCP) and other subnets running on legacy hardware. New hardware would benefit from better security and registration than legacy devices such as HDCP that have weak security.

There are multiple secure authenticated transmission paths in the system and any and all elements can be used in the authentication chain for a service or purchase. For example:

DSL Edge site to DSL modem or Home Gateway;
Home Gateway to STB;
Home Gateway to PC;
PC to Monitor.

A security element can be used to directly connect to the keyboard of a PDA or PC and commands are communicated from a remote computer to the security element requiring a response that is encrypted by the security element and sent to the remote computer.

The authentication method and system as described above can avoid or reduce problems as a result of phishing requests. A user can verify that an email or data came from a trusted authenticated source by using the authentication method as described above. For example, when communicating with a banker, the user can check that the source of a message was from the banker. The system can verify that the credentials of a remote source are appropriate for the information requested.

As noted above, trace route mapping can be used to determine the network topology so that the edge site or router can be detected and verified. A known trace route map may be used, not only for routers but also for network equipment at layers 1, 2, 3, . . . for determining how packet encapsulation is occurring at lower network layers. When trace route mapping does not give the type of interface in the trace route response, an association between the trace route from the security headend to the subscriber can be established by the network service provider. An example is as follows:

Trace route subscriber123456, which translates into IP address 205.171.17.135. The trace route from the headend in identifying the subscriber may look as follows:

1 pos2-0-155m.cr2.telco.net (205.171.17.130) 2 ms
2 205.171.17.135 1 ms.

In the above example, a trace route from the headend identified the connection to subscriber123456 as connection via hop 1 pos2-0-155m.cr2.telco.net and an association can be determined via the network management console or equivalent interface that this connection/IP address is associated with a particular physical copper wire pair from a local office to a home at a particular address.

A similar trace route associative map can map a subscriber's IP address to a Cable Modem Termination System (CMTS) MAC address and/or physical DOCSIS (or similar) cable modem identification and subscriber. The term "trace route" is used herein for illustrative purposes, however any command or interface that provides an association of a subscriber to the physical layer connection to a service provider edge site or network access point can be substituted for trace route. It is envisioned that new commands can be developed to provide the appropriate association of a subscriber to a physical layer, data link, network, transport or higher layer of the OSI seven layer protocol model.

While it is envisioned that multiple pieces of network equipment in a network distribution service may be associated or authenticated with a physical connection or the like, the most important association that can be established is the so-called "last mile" association between the subscriber's physical network access device (e.g., a data modem, cable modem, ATM modem, fiber optic modem, DSL modem or other in-home modem device) and the network edge site that physically terminates the connection with the home. Such association can include any one or more than one of the following seven layers of the OSI layered network model referred to as physical layer, data link layer, network layer, transport layer, session layer, presentation layer, or application layer as indicated in Table 2 above. The subscriber association can typically be established at the Physical Layer with a mapping of the physical layer connection (DSL, Sonet, Fast Ethernet such as 100BaseT, Integrated Services Digital Network (ISDN), token ring, Fiber Distributed Date Interface (FDDI), wide area network (WAN), ATM, Hybrid Fiber/Coax network, or other physical layer technology). Additional physical layer associations can be established for a subscriber but the key one is the last-mile association that provides service to a home or location. It is also envisioned that one or more layers maybe combined to associate a subscriber with a physical connection, for example incorporating a data link layer (layer 2) parameter such as Media Access Control (MAC) address on the network edge device with a subscriber and the physical layer connection to the subscriber's premise. Such association can be established via communications to network edge equipment if available, or via a database operated by the service provider or equivalent. Resolution of Subscriber Association can be as fine as a physical copper wire pair connection to a home, or a DOCSIS address on a cable modem termination system (CMTS), or the MAC or logical link control layer (LLC) or radio link address on a wireless last mile connection between a home and a network, or a base station connecting a wireless customer to a wireless network.

The authentication or physical connection ID information needed to authenticate a subscriber or client with a communication line may be provided by the Telco Data Center 10 (or equivalent) or the Telco Edge Site 30 (or equivalent) or Trusted CA 20 (or equivalent) that associates a client (STB 12, PC 14, Carrier Based Wireless Device 18, PDA, or other client) with the communication line. The minimum information required for authentication is a client ID and a communication line ID. The client ID is a value that is used to track a specific client device connecting to a network via a communication line. This value can be an arbitrary value that has a permanent fixed value for a subscriber or it can be a temporary value for only a single connection. This value can be based on an IP address, IP address and port number, subscriber ID, a random number derived from the subscriber ID, an identifier provided by the Telco Edge Site such as a NAT'd address, or other similar data value that is used to identify or associate a client device with the communications line information field described below. The Communications Line Identifier or ID is a permanent identifier for the Communications Line that connects the Telco Edge Site to the computer equipment or modem or gateway within a physical structure 40. This value provides a permanent identifier such that any client device connected with physical structure 40 can be verified.

In an exemplary embodiment of the invention, additional verification or authentication information may be acquired for added security. For example, a signature, security code, or other identifier can be used to verify that the Client ID data field and the Communications Line ID have not been modified. This field can be as simple as a signed hash of the Client ID and Communications Line ID fields. Alternatively, a signed value may be generated by two different hashes, such that the possibility of tampering the hash by exploiting hash collisions is eliminated. The signed hash or hashes may be encrypted using the private key of the Telco Edge Site 30 or Telco Data Center 10 or Trusted CA 20 or equivalent. When a pair of signed hashes are used to eliminate tampering by exploiting hash collisions, the two hashes are different types of hashes that have different hash collisions. For example, when a pair of hashes is used to eliminate signature tampering by exploiting hash collisions, one hash can be MD5 while the other hash is a different hash with different collision properties such as SHA1. If a single hash is used twice, the computation of the hash can be based on the exact data and the second hash can be computed using a SALTed hash similar to the SALT values added to randomize passwords to eliminate identical randomized password values stored in a database when users select the same password for a system (SALT is a random string of data used to modify an encryption). When two identical hashes are used, one can use the exact data without modification and the second can use a randomizer or whitener that is applied when computing the second hash of the data being signed. If the data is being tampered with to exploit hash collisions, the randomizer or whitener can cause the hash collision exploitation to fail because the exploited collision is in only one of the two computed hashes. This is because each hash computation is using different data as the input to the hash function, since the first hash is the exact data and the second hash has the data used by the first hash function randomized or whitened. The randomizer or whitener can be a simple function such an exclusive OR (XOR) function or can be a more elaborate function such as a random number derived from a seed that is used to provide different input data to the second hash calculation.

The embodiments described herein may include an aspect of renewability should the security or authentication system be hacked or otherwise compromised. In some cases, the renewability can be achieved by simply changing the cryptographic technique from one to another. For example, if an advanced encryption standard (AES) 128 encryption scheme is being deployed and it is hacked, a quick move to another standard, such as an RC-4 encryption scheme, as developed by RSA Security of Bedford, Mass., may serve to protect the content for a few days or weeks. In that case, the system designers have time to update the original encryption method in order to re-deploy it at a later date.

Server-side, client-side, and peer-to-peer users of a network may have empathy for each other, but one primary concern of all users is protection of one's own welfare against various risks. The primary risks in network use are:

1. Clients receiving spam emails and viruses from unknown entities (an example of client-side risk);
2. Web-based retailers who experience a high degree of fraud from customers using stolen credit cards, identity theft, and the like, particularly for instant consumption consumer services such as long distance telephone services (Example of server-side risk);
3. Clients on an e-commerce network such as e-Bay who are worried about entering into transactions with unknown buyers or sellers—(Example of peer-to-peer risk).

The authentication system of this invention, if used by both clients and retailers for secure identification purposes based on specific physical structures, can alleviate some or all of these concerns.

The authentication system can also be used to deliver secure pay television content to set top boxes and to send sensitive information and materials to user devices such as computers and hand-held devices over a public network. If such content is leaked or further distributed to unauthorized users, it is relatively easy to identify the source of the leak. The system can be used for authentication of medical, financial, and other sensitive information, such as emergency information. Various types of high value network services can become more readily and safely available using such two way authentication (provider and client authentication), such as early release window content distribution, high definition content distribution, secure e-Bay transactions, secure banking transactions, secure peer-to-peer transactions, secure email communications, and the like.

Those of skill will appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A network user authentication system for authenticating user devices located in a building, comprising:
   a secure component physically connected to the building, wherein the secure component can be used to authenticate user devices located in the building;
   a security server;
   at least one network linking the security server to the secure component;
   the security server being configured to determine a physical connection identification (ID) for the secure component and to associate the physical connection ID with a network service subscriber using the user device;
   a service provider network edge site and at least one connecting line providing communication between the edge site and the building, the secure component comprising the connecting line from the edge site to the building; and
   a building gateway module in the building linked to the connecting line, the building gateway module being configured to provide an interface between the connecting line and user devices in the building,
   wherein the edge site comprises an edge site server configured to provide authentication service to a plurality of buildings in a neighborhood, wherein the edge site server has dedicated connecting lines providing dedicated communications with a plurality of buildings in a local community, the edge site server having a processor module configured to store a plurality of unique digital certificates and to link each digital certificate with a respective dedicated line connected to the building with which said digital certificate is associated, and
   wherein the edge site server is a Telco server and is configured to authenticate a trusted path comprising one or more network nodes between a user device and a web server over a public network, and
   wherein the web server transmits content to the user device along the trusted path, and wherein the content is encrypted using multiple layers of encryption, wherein each layer of encryption is associated with a network element along the trusted network path, each layer comprising a decryption destination point indicator that indicates which network element should decrypt that layer of encryption.

2. The system as claimed in claim 1, wherein said secure component is a dedicated line connected to the building.

3. The system as claimed in claim 2, wherein the line is a broadband telecommunication line having one end connected to the building.

4. The system as claimed in claim 2, wherein the line is a digital subscriber line (DSL).

5. The system as claimed in claim 2, wherein the line is a fiber line.

6. The system as claimed in claim 2, wherein the line is a dedicated wireless link to the building.

7. The system as claimed in claim 1, wherein the security server is a stand-alone server linked to the secure component over at least one network.

8. The system as claimed in claim 1, wherein said user devices comprise at least one personal computer.

9. The system as claimed in claim 8, wherein said user devices further comprise at least one set top box.

10. The system as claimed in claim 8, wherein said user devices further comprise at least one wireless communication device.

11. The system as claimed in claim 10, wherein the wireless device is selected from the group consisting of a mobile phone, a personal digital assistant, and a wireless computer.

12. The system as claimed in claim 1, further comprising a plurality of user devices in each building linked to said gateway module and configured for secure network communications using the unique digital certificate associated with the dedicated line connecting the respective building to the edge site server.

13. The system as claimed in claim 1, wherein said gateway module has a first hardware security element associated with said unique digital certificate.

14. The system as claimed in claim 13, wherein said hardware security element is selected from the group consisting of a universal serial bus (USB) dongle, a smart card, a SIM chip, and a trusted platform module (TPM).

15. The system as claimed in claim 13, wherein the user device has a second hardware security element cryptographically synchronized with the first hardware security element in said gateway module.

16. The system as claimed in claim 1, wherein said gateway module has at least one hardware security element associated with said unique digital certificate and each user device has a hardware security element cryptographically synchronized with a hardware security element in said gateway module.

17. The system as claimed in claim 16, wherein at least one of said user devices is a wireless device having a security element comprising a first subscriber identity module (SIM) chip and the gateway module has a second SIM chip configured to communicate with said first SIM chip for authenticated wireless communication purposes.

18. The system as claimed in claim 1, further comprising a session-based watermarking module associated with said user device and configured to insert a unique watermark payload into all content files received by said user device over a public network.

19. The system as claimed in claim 18, wherein said session-based watermarking module is further configured to cryptographically sign the watermark payload with a user private key associated with a unique digital certificate.

20. A network user authentication system for authenticating a user devices in a building, comprising:
   a secure component physically connected to a building and associated with a first user device, wherein the secure component comprises a dedicated line connected to the building;
   an authentication server;
   at least one network linking the authentication server to the secure component;
   the authentication server having a trusted path certification module configured to create a client ID associated with the user device, to identify the secure component, and to associate a unique digital certificate with the secure component, and a data storage module for storing the client ID and associated digital certificate; and
   the authentication server further comprising a verification module for using the client ID and associated digital certificate for secure communications between the user device and other user devices over a public network, and
   wherein the authentication server is a Telco server and is configured to authenticate a trusted path comprising one or more network nodes between the first user device and a second user device over the public network, and wherein the first user device transmits content to the second user device along the trusted path, and wherein the content is encrypted using multiple layers of encryption, wherein each layer of encryption is associated with a network element along the trusted network path, each layer comprising a decryption destination point indicator that indicates which network element should decrypt that layer of encryption.

21. The system as claimed in claim 20, wherein the unique digital certificate associated with the secure component comprises an X.509 based digital certificate.

22. The system as claimed in claim 20, further comprising a control unit associated with said secure component having a processor module and a data storage module, the authentication server further comprises a certificate transfer module configured to transmit the digital certificate to the control unit, the processor module being configured to store said digital certificate in said data storage module and to use said digital certificate for secure communications between said user device and other web servers over a public network.

23. A method for authenticating network users for secure communication over a public network, comprising:
associating a unique digital certificate with a physical connection, the digital certificate comprising a physical connection identification (physical connection ID) of a secure component physically attached to a building, storing the unique digital certificate in a data storage area associated with the physical connection, and using the unique digital certificate for verification purposes in network communications with prospective network partners over a public network;
receiving a request for building authentication from a user device in the building at an authentication server through the secure component and at least one private network, wherein the authentication server is a Telco server;
determining a subscriber identification (subscriber ID) for a user of the user device;
verifying the physical connection ID of the secure component;
storing a record of the subscriber ID and associated physical connection ID;
determining a current physical connection ID of the secure component used by a connecting subscriber at each request for service received from the connecting subscriber;
comparing the current physical connection ID with a previously stored physical connection ID for the same subscriber ID for verification purposes; and
supplying the service only if the verification is successful, wherein content associated with the service is transmitted along a trusted communication path, and the content is encrypted using multiple layers of encryption, wherein each layer of encryption is associated with a network element along the trusted network path, each layer comprising a decryption destination point indicator that indicates which network element should decrypt that layer of encryption.

24. The method as claimed in claim 23, further comprising determining the physical connection identification from information available in a network data structure.

25. The method as claimed in claim 23, further comprising associating a first hardware security element in the secure component with the unique digital certificate, and cryptographically synchronizing a hardware security element in at least one user device in the building with the first hardware security element.

26. The method as claimed in claim 23, further comprising inserting a unique watermark payload associated with the building into content files received by a user device in the building over a network.

27. The method as claimed in claim 26, further comprising verifying the geographic location of the building using a location sensor at said secure component for determining the geographic coordinates of said secure component.

28. The method as claimed in claim 27, wherein the geographic location of the building is verified each time a user device in the building initiates secure communications with a prospective network partner over a public network.

29. A network user authentication system, comprising:
a secure component physically connected to a building and associated with at least one user device in the building;
a control unit associated with said secure component, the control unit having a processor module and a data storage module associated with the processor module;
an authentication server;
at least one network linking the authentication server to the control unit;
the authentication server being configured to associate a unique digital certificate with the secure component and to transmit the unique digital certificate to the control unit associated with the secure component; and
the processor module being configured to store the unique digital certificate in said data storage module and to use the digital certificate for secure communications between the user device and other web servers over a public network,
wherein the control unit comprises an edge site server configured to provide authentication service to a plurality of buildings in a neighborhood, the edge site server having a plurality of dedicated lines each connected to a respective one of the buildings, the processor module being configured to store a plurality of unique digital certificates in said data storage module and to link each digital certificate with a respective dedicated line connected to the building with which said digital certificate is associated, and
wherein the edge site server is a Telco server and is configured to authenticate a trusted path comprising one or more network nodes between the user device and a web server over the public network, and
wherein the web server transmits content to the user device along the trusted path, and wherein the content is encrypted using multiple layers of encryption, wherein each layer of encryption is associated with a network element along the trusted network path, each layer comprising a decryption destination point indicator that indicates which network element should decrypt that layer of encryption.

30. The system as claimed in claim 29, wherein the authentication server is a utility company server.

31. The system as claimed in claim 29, wherein the authentication server is a utility company server linked to said edge site server.

32. The system as claimed in claim 29, further comprising a utility company server linked to the edge site server over a utility company network, the authentication server comprising a separate server linked to the utility company server for communication with said edge site server.

33. The system as claimed in claim 29, further comprising a gateway module in the building connected to said dedicated line, the gateway module being linked to the user device.

34. The system as claimed in claim 33, further comprising a plurality of additional user devices in said building, said processor module being configured to communicate with said additional user devices in said building.

35. The system as claimed in claim 29, wherein the secure component is a secure box physically connected to a structural component of the building, and the control unit is contained in said secure box, the processor module being configured for communication with said user device.

36. The system as claimed in claim 35, wherein the control unit further comprises a location sensor connected to said processor module for providing geographic location coordinates, said processor module being configured to transmit said geographic location coordinates to said authentication server, and said authentication server being configured to use said geographic location coordinates to validate the building location.

37. The system as claimed in claim 29, wherein said control unit further comprises a first hardware security element cryptographically synchronized with said digital certificate.

38. The system as claimed in claim 37, wherein the user device has a second hardware security element cryptographically synchronized with said first hardware security element.

* * * * *